United States Patent
Jeong et al.

(10) Patent No.: US 9,377,234 B2
(45) Date of Patent: Jun. 28, 2016

(54) REFRIGERATOR DOOR ICE MAKER AND DISPENSER WITH A COUPLING UNIT FOR MOTOR CONNECTION BETWEEN THE DOOR AND THE MAIN BODY

(71) Applicant: SAMSUNG ELECTRONICS CO., LTD., Suwon-si (KR)

(72) Inventors: Jin Jeong, Yongin-si (KR); Kyoung Ki Park, Gwangju (KR); Bong Su Son, Cheonan-si (KR); Do Yun Jang, Busan (KR); Jae Koog An, Gwangju (KR); Bu Kil Jeong, Gwangju (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 269 days.

(21) Appl. No.: 13/911,307

(22) Filed: Jun. 6, 2013

(65) Prior Publication Data

US 2013/0327076 A1     Dec. 12, 2013

(30) Foreign Application Priority Data

Jun. 7, 2012   (KR) .................. 10-2012-0061060
Apr. 2, 2013   (KR) .................. 10-2013-0036051

(51) Int. Cl.
    *F25C 5/18*         (2006.01)
    *F25C 1/22*         (2006.01)
                   (Continued)

(52) U.S. Cl.
CPC ... *F25C 5/02* (2013.01); *A23G 9/12* (2013.01); *F25C 5/005* (2013.01); *F25C 5/182* (2013.01);
(Continued)

(58) Field of Classification Search
CPC ............ F25C 5/182; F25C 5/185; F25C 5/18; F25C 2700/10; F25C 5/00; F25C 5/16; F25C 5/005; F25C 5/046; F25C 5/007; F25D 23/04; F25D 17/065; A23G 9/12
USPC .......................... 62/340, 344, 320; 312/405.1
See application file for complete search history.

(56) References Cited

U.S. PATENT DOCUMENTS 3,635,043 A * 1/1972 Sterling .................. F25C 5/187
                                                            62/137
4,252,002 A * 2/1981 Mullins, Jr. ............. F25C 5/007
                                                            222/236

(Continued)

FOREIGN PATENT DOCUMENTS

| KR | 20-0163788 | 2/2000 |
|---|---|---|
| KR | 10-2005-0077558 | 8/2005 |
| KR | 10-2011-0038369 | 4/2011 |

OTHER PUBLICATIONS

International Search Report issued Sep. 4, 2013 in corresponding Patent Application No. PCT/KR2013/004789.

(Continued)

*Primary Examiner* — Allen Flanigan
*Assistant Examiner* — Filip Zec
(74) *Attorney, Agent, or Firm* — Staas & Halsey LLP

(57) ABSTRACT

A refrigerator including an icemaker and an ice bucket provided at a door, a feeding unit to feed ice cubes stored in the ice bucket, a driving motor provided at a main body to drive the feeding unit, and a coupling device to transmit driving force from the driving motor to the feeding unit. When the door is closed, the driving motor is connected to the feeding unit. When the door is opened, the driving motor is disconnected from the feeding unit. Accordingly, the door has a simple structure, the ice bucket has an increased capacity, repair or replacement of the driving motor is easily achieved. The coupling device includes a first coupling unit and a second coupling unit which is engaged with the first coupling unit to receive driving force. The coupling device is configured to hide the coupling units when the door is opened.

31 Claims, 20 Drawing Sheets

(51) Int. Cl.
   *F25C 5/02*  (2006.01)
   *A47B 96/04*  (2006.01)
   *A23G 9/12*  (2006.01)
   *F25D 17/06*  (2006.01)
   *F25C 5/00*  (2006.01)
   *F25D 23/04*  (2006.01)

(52) U.S. Cl.
   CPC .............. *F25C 5/185* (2013.01); *F25D 17/065* (2013.01); *F25D 23/04* (2013.01); *F25C 5/18* (2013.01); *F25C 2700/10* (2013.01)

(56) References Cited

U.S. PATENT DOCUMENTS

| | | | | |
|---|---|---|---|---|
| 4,942,979 A * | 7/1990 | Linstromberg | ......... | F25C 5/005 221/75 |
| 4,974,750 A * | 12/1990 | Welch | ................ | A47L 15/4409 222/129 |
| 5,273,219 A * | 12/1993 | Beach, Jr. | ............... | F25C 5/005 222/240 |
| 6,082,130 A | 7/2000 | Pastryk et al. | | |
| 6,224,297 B1 * | 5/2001 | McCann | ............. | B65G 53/525 406/105 |
| 6,442,954 B1 * | 9/2002 | Shapiro | .................. | F25C 5/005 62/137 |
| 6,758,047 B1 * | 7/2004 | Giles | ....................... | F25C 5/007 222/146.6 |
| 6,880,355 B2 | 4/2005 | Jung | | |
| 7,017,363 B2 * | 3/2006 | Lee | ........................... | F25C 1/04 241/DIG. 17 |
| 7,240,512 B2 * | 7/2007 | Lee | ....................... | F25D 17/065 62/353 |
| 7,698,901 B2 * | 4/2010 | Koons | ..................... | F25C 5/005 62/137 |
| 7,743,623 B2 * | 6/2010 | Guarino | .................. | F25C 5/005 62/329 |
| 7,770,408 B2 * | 8/2010 | Kim | ........................ | F25C 5/005 221/10 |
| 8,151,594 B2 | 4/2012 | Kim | | |
| 8,826,683 B2 * | 9/2014 | Nuss | ....................... | F25C 5/005 62/320 |
| 8,899,065 B2 * | 12/2014 | Lee | ........................... | F25C 1/24 62/135 |
| 9,103,577 B2 * | 8/2015 | Hwang | ................... | F25C 5/005 |
| 2005/0132739 A1 * | 6/2005 | Sannasi | .................. | F25C 5/185 62/344 |
| 2005/0262866 A1 | 12/2005 | Seo et al. | | |
| 2007/0113578 A1 | 5/2007 | Wu et al. | | |
| 2010/0126203 A1 * | 5/2010 | Kim | ........................ | F25C 5/185 62/344 |

OTHER PUBLICATIONS

Korean Office Action mailed Dec. 8, 2015 in related Korean Application No. 10-2013-0036051.
Korean Office Action dated Apr. 8, 2016 in corresponding Korean Patent Application No. 10-2013-0036051.

* cited by examiner

REFRIGERATOR DOOR ICE MAKER AND DISPENSER WITH A COUPLING UNIT FOR MOTOR CONNECTION BETWEEN THE DOOR AND THE MAIN BODY

CROSS-REFERENCE TO RELATED APPLICATIONS

This application claims the benefit of Korean Patent Application Nos. 10-2012-0061060 and 10-2013-0036051, filed on Jun. 7, 2012 and Apr. 2, 2013, respectively, in the Korean Intellectual Property Office, the disclosures of which are incorporated herein by reference.

BACKGROUND

1. Field

Embodiments of the present disclosure relate to a refrigerator having an icemaker provided at a door.

2. Description of the Related Art

In general, a refrigerator is an appliance which has a storage compartment to store food therein and a cool air supply device to supply cool air to the storage compartment, to thereby keep food in a fresh state. A storage compartment is formed in a main body and has an opened front surface which is opened and closed by a door.

A refrigerator may include an icemaker to produce ice cubes, an ice bucket to store ice cubes produced by the icemaker, a feeding unit to feed ice cubes to the ice bucket, a driving motor to drive the feeding unit and a crushing device to crush ice cubes in the ice bucket into ice pieces.

The above components may be provided at a door as opposed to a storage compartment. A conventional exemplary refrigerator is disclosed in U.S. Pat. No. 6,082,130. The conventional refrigerator includes an ice bucket provided at a door to store ice cubes therein, and a feeding unit provided at the ice bucket to feed the ice cubes.

An ice storage space is provided above the ice bucket and an ice crushing space is provided below the ice bucket. The feeding unit has a rotation shaft extending vertically. A driving motor to drive the feeding unit is mounted to the door and located below the ice bucket.

SUMMARY

It is an aspect of the present disclosure to provide a refrigerator in which an ice bucket provided with a feeding unit is disposed at a door and the ice bucket has an increased capacity.

It is another aspect of the present disclosure to provide a refrigerator in which an ice bucket provided with a feeding unit is disposed at a door and the door has a simple structure.

It is a further aspect of the present disclosure to provide a refrigerator in which an ice bucket provided with a feeding unit is disposed at a door and ice feeding operation is smoothly performed.

It is a further aspect of the present disclosure to provide a refrigerator including a coupling device which is configured to transmit driving force from a driving motor disposed at a main body to a feeding unit disposed at a door and has a structure capable of easily accomplishing connection and disconnection.

It is a further aspect of the present disclosure to provide a refrigerator including a coupling device which is configured to transmit driving force from a driving motor disposed at a main body to a feeding unit disposed at a door and has an improved external appearance and safety.

Additional aspects of the disclosure will be set forth in part in the description which follows and, in part, will be apparent from the description, or may be learned by practice of the disclosure.

In accordance with one aspect of the present disclosure, a refrigerator includes a main body having a storage compartment, a door rotatably coupled to the main body to open and close the storage compartment, an icemaker provided at the door, an ice bucket provided at the door to store ice cubes produced by the icemaker, the ice bucket being provided with a feeding device to feed the ice cubes stored therein, and a driving device provided at the main body to drive the feeding device. When the door is closed, the driving device is connected to the feeding device, and when the door is opened, the driving device is disconnected from the feeding device.

The driving device may include a driving motor to generate driving force and a driving coupler to be connected to the feeding device. The feeding device may include a feeding unit to feed the ice cubes and a driven coupler to be connected with or separated from the driving coupler. When the door is closed, the driving coupler and the driven coupler may be connected to each other, and when the door is opened, the driving coupler and the driven coupler may be separated from each other.

The driven coupler may include a support part and a pressurized part protruding from the support part. The pressurized part may have a proximal end located apart from a rotation center by a distance of a first radius and a distal end located apart from the rotation center by a distance of a second radius. The driving coupler may include a wing part and a pressurizing part protruding from the wing part. The pressurizing part may have a proximal end and a distal end, at least one of which is located apart from the rotation center by a distance between the first radius and the second radius.

The driving coupler and the driven coupler may be made of a resin material.

The driving motor may be disposed at a side wall of the main body, and the driving device may include a reducer to reduce rotation speed of the driving motor and transmit driving force from the driving motor to the driving coupler.

The driving motor may be disposed at a top wall of the main body, and the driving device may include at least one worm gear to transmit driving force from the driving motor to the driving coupler.

The ice bucket may include a storage space to store the ice cubes dropping from the icemaker and a crushing space in which the ice cubes are crushed into ice pieces. The crushing space may be horizontally arranged in the storage space. The feeding unit may include a rotation shaft horizontally extending to feed the ice cubes in the storage space to the crushing space. The driven coupler may be disposed at the rotation shaft of the feeding unit.

The ice bucket may include a storage space to store the ice cubes dropping from the icemaker and a crushing space in which the ice cubes are crushed into ice pieces. The crushing space may be disposed below the storage space. The feeding unit may include a rotation shaft vertically or slantedly extending to feed the ice cubes in the storage space to the crushing space. The feeding device may include at least one worm gear to transmit driving force from the driven coupler to the feeding unit.

The ice bucket may include a discharge port to discharge the ice cubes therethrough and a crushing device to crush the ice cubes into ice pieces. The crushing device may include a fixed blade fixed to the ice bucket, a rotational blade coupled to a rotation shaft of the feeding unit, a guide member rotatably coupled to the discharge port to crush the ice cubes, and a switching motor to rotate the guide member.

In accordance with another aspect of the present disclosure, a refrigerator includes a main body having an inner casing, an outer casing and an insulation wall provided between the inner casing and the outer casing, a storage compartment formed in the inner casing, a door rotatably coupled to the main body to open and close the storage compartment, an icemaker provided at the door, an ice bucket provided at the door to store ice cubes produced by the icemaker, the ice bucket being provided with a feeding unit to feed the ice cubes stored therein, and a driving motor provided at the main body to drive the feeding unit.

The inner casing may be formed with a concave-shaped motor receiving part which is depressed inside the insulation wall, and at least a portion of the driving motor may be received in the motor receiving part.

The driving motor may be fixed to an outer surface of the outer casing.

The driving motor may be fixed to an inner surface of the inner casing.

The refrigerator may further include a driving force transmission device to transmit driving force from the driving motor to the feeding unit. The driving force transmission device may include a driving coupler provided at the main body and a driven coupler provided at the door and configured to be coupled to the driving coupler when the door is closed and to be separated from the driving coupler when the door is opened.

The driving force transmission device may further include a worm gear to transmit driving force from the driving motor to the driving coupler.

In accordance with a further aspect of the present disclosure, a refrigerator includes a main body having a storage compartment, a door rotatably coupled to the main body to open and close the storage compartment, an icemaker provided at the door, an ice bucket provided at the door to store ice cubes produced by the icemaker, a feeding unit including a driven coupler to receive driving force, the feeding unit configured to feed the ice cubes in the ice bucket in a horizontal direction, and a driving motor assembly provided at a side wall of the main body, the driving motor including a driving coupler which is connected to or separated from the driven coupler.

In accordance with a further aspect of the present disclosure, a refrigerator includes a main body having a storage compartment, a door rotatably coupled to the main body to open and close the storage compartment, an icemaker provided at the door, an ice bucket provided at the door to store ice cubes produced by the icemaker, the ice bucket being provided with a feeding unit to feed the ice cubes stored therein, a driving motor provided at the main body to generate driving force, and a coupling device to transmit driving force from the driving motor to the feeding unit, the coupling device including a driving coupler having a first coupling unit and a driven coupler having a second coupling unit which is engaged with the first coupling unit to receive driving force. The coupling device is configured to hide at least one of the first coupling unit and the second coupling unit when the door is opened.

The first coupling unit may include an insertion protrusion, and the second coupling unit may include an insertion recess into which the insertion protrusion is inserted.

The driving coupler may further include a first cover provided movably forward and backward around the insertion protrusion so as to hide the insertion protrusion when the door is opened.

The driving coupler may further include a first spring to elastically support the first cover so as to enable the first cover to hide the insertion protrusion.

The driven coupler may further include a second cover provided movably forward and backward in the insertion recess so as to hide the insertion recess when the door is opened.

The driven coupler may further include a second spring to elastically support the second cover so as to enable the second cover to hide the insertion recess.

If the insertion protrusion is located at a position incapable of being inserted into the insertion recess when the door is closed, the second coupling unit may move backward in an axial direction by pressurization of the insertion protrusion.

The driven coupler may further include a third spring to return the second coupling unit so that if the insertion protrusion moves to a position capable of being inserted into the insertion recess by operation of the driving motor in the state that the second coupling unit moves backward, the insertion protrusion is inserted into the insertion recess.

In accordance with a further aspect of the present disclosure, a refrigerator includes a main body having an inner casing, an outer casing and an insulation wall provided between the inner casing and the outer casing, a storage compartment formed in the main body, a door rotatably coupled to the main body to open and close the storage compartment, an icemaker provided at the door, an ice bucket provided at the door to store ice cubes produced by the icemaker, the ice bucket being provided with a feeding unit to feed the ice cubes stored therein, a driving motor provided at the main body to drive the feeding unit, and a motor housing to accommodate the driving motor, the motor housing including a first housing supported by the inner casing and the insulation wall and a second housing coupled to the first housing.

The first housing may be fixed to the inner casing by adhesive force of an insulation material used to form the insulation wall, and the second housing may be screw-coupled to the first housing.

The second housing may include a protruding part protruding toward the storage compartment so as to define a space to accommodate the driving motor.

The storage compartment may be provided with a mini-drawer to hide the protruding part.

The refrigerator may further include a first coupling unit coupled to a driving shaft of the driving motor and including an insertion protrusion configured to transmit driving force from the driving motor to the feeding unit, and a second coupling unit coupled to a rotation shaft of the feeding unit and including an insertion recess into which the insertion protrusion is inserted.

The refrigerator may further include a first cover provided movably forward and backward around the insertion protrusion so as to hide the insertion protrusion when the door is opened, and a second cover provided movably forward and backward in the insertion recess so as to hide the insertion recess when the door is opened.

The second housing may be formed with an opening which is blocked by the first coupling unit when the door is opened and through which the second coupling unit passes when the first coupling unit and the second coupling unit are coupled.

As described above, in the refrigerator constructed such that the ice bucket provided with the feeding unit is disposed at the door, the driving motor to drive the feeding unit may be mounted to the main body as opposed to the door. Accordingly, a capacity of the ice bucket may be increased.

Since the rotation shaft of the feeding unit is horizontally arranged, the ice feeding operation of the feeding unit may be smoothly performed.

In addition, the door may have a simple structure.

Repair or replacement of the driving motor may be easily achieved.

Further, in the coupling device to transmit driving force from the driving motor to the feeding unit, the driving coupler coupled to the driving motor disposed at the main body and the driven coupler coupled to the feeding unit disposed at the door may be smoothly connected.

Further, since the driving coupler and the driven coupler are concealed by the covers and are not exposed to the outside when the door is opened, external appearance and aesthetics may be improved, and the risk of injury from direct contact of a body of a user with the driving coupler or the driven coupler may be prevented.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
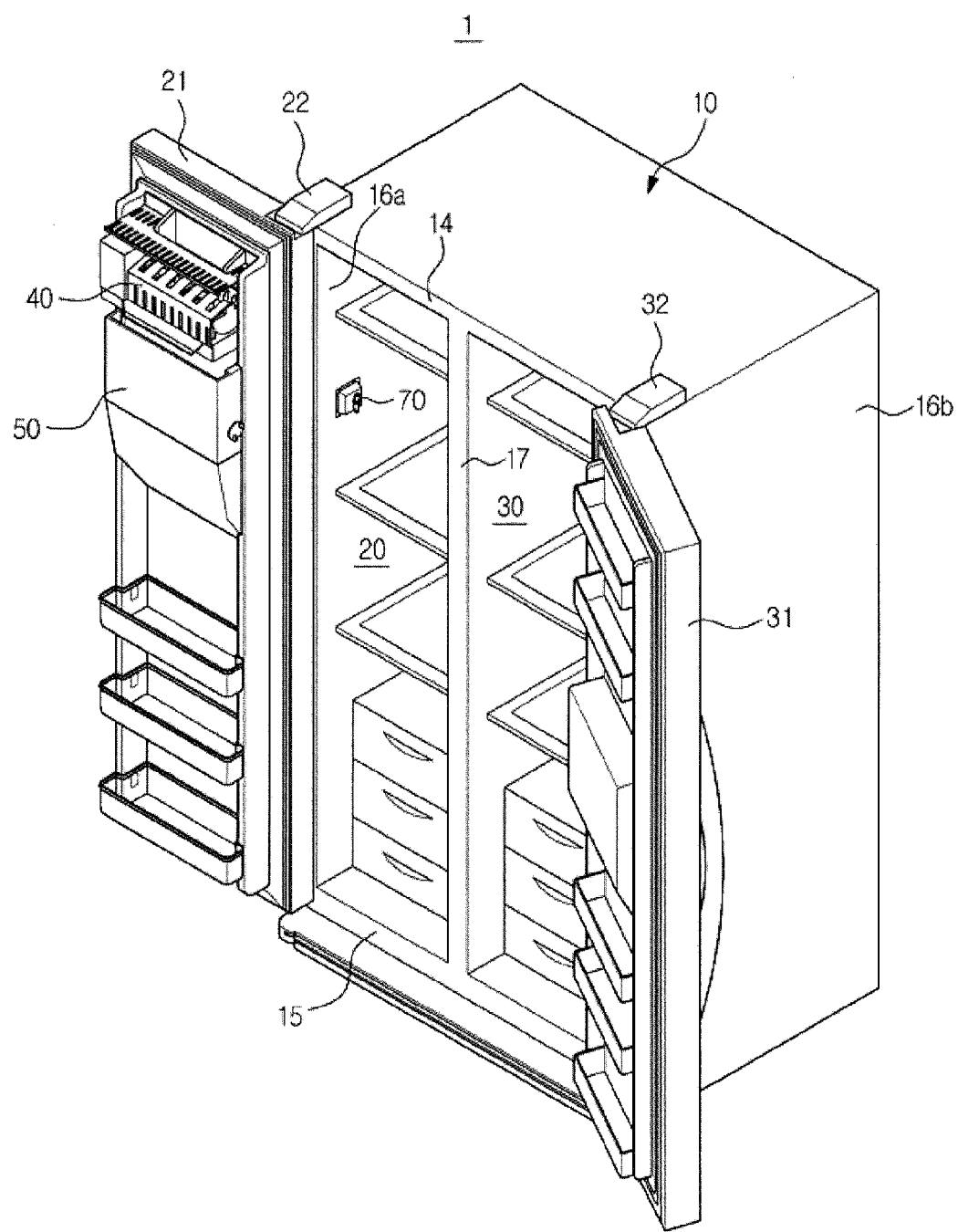
FIG. 1 is a perspective view illustrating a refrigerator according to a first embodiment of the present disclosure.

Reference will now be made in detail to the embodiments of the present disclosure, examples of which are illustrated in the accompanying drawings, wherein like reference numerals refer to like elements throughout.

FIG. 1 is a perspective view illustrating a refrigerator according to a first embodiment of the present disclosure.

As exemplarily shown in FIG. 1, a refrigerator 1 according to the first embodiment of the present disclosure includes a main body 10, storage compartments 20 and 30 formed in the main body 10, and a cool air supply device (not shown) to supply cool air to the storage compartments 20 and 30.

The main body 10 includes an inner casing 11 (refer to FIG. 4) to define the storage compartments 20 and 30, an outer casing 12 (refer to FIG. 4) coupled outside of the inner casing 11 and an insulation wall 13 (refer to FIG. 4) disposed between the inner casing 11 and the outer casing 12.

The inner casing 11 may be made of a resin material by injection molding and the outer casing 12 may be made of a metal material for high design quality and durability. The insulation wall 13 may be formed of rigid urethane foam, or may be formed by injecting a raw urethane material into a space between the inner casing 11 and the outer casing 12 that are coupled to each other.

The main body 10 may be formed in a substantially box-shaped configuration having an opened front surface. The main body 10 may include a top wall 14, a bottom wall 15, a pair of side walls 16a and 16b, a rear wall, and an intermediate wall 17. The storage compartments 20 and 30 may be divided by the intermediate wall 17 into a freezing compartment 20 on the left and a refrigerating compartment 30 on the right. A temperature of the freezing compartment 20 may be about −18° C. and a temperature of the refrigerating compartment 30 may be about 0° C. to 5° C. The positions of the freezing compartment 20 and the refrigerating compartment 30 are not limited to this arrangement and various configurations are possible.

A freezing compartment door 21 may be rotatably coupled to the main body 10 by a hinge 22, so as to open and close an opened front surface of the freezing compartment 20. In addition, a refrigerating compartment door 31 may be rotatably coupled to the main body 10 by a hinge 32, so as to open and close an opened front surface of the refrigerating compartment 30.

The freezing compartment door 21 is provided with an icemaker 40 to produce ice cubes and an ice bucket 50 to store ice cubes produced by the icemaker 40. The icemaker 40 may produce ice cubes using cool air in the freezing compartment 20.

The ice bucket 50 is disposed below the icemaker 40 at the freezing compartment door 21. The ice bucket 50 is provided with a feeding device 61 and 63 (refer to FIG. 2) to feed ice cubes stored therein. The main body 10 is provided with a driving device 70 to drive the feeding device 61 and 63. Hereinafter, a structure of the refrigerator according to the embodiment of the present disclosure will be described focusing on the feeding device and the driving device 70.

Figure 2:
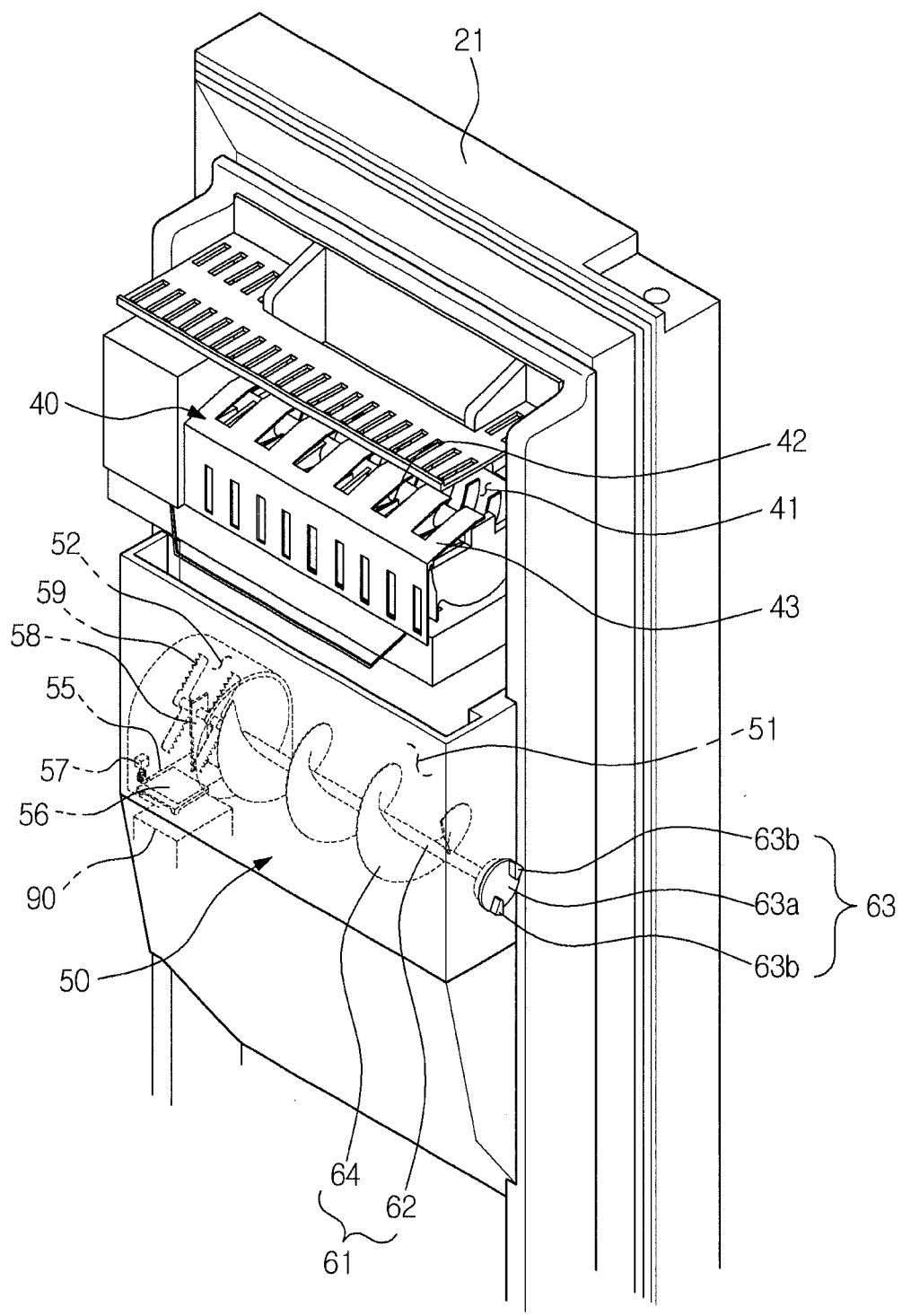
FIG. 2 is a perspective view illustrating a door of the refrigerator depicted in FIG. 1.
Figure 3:
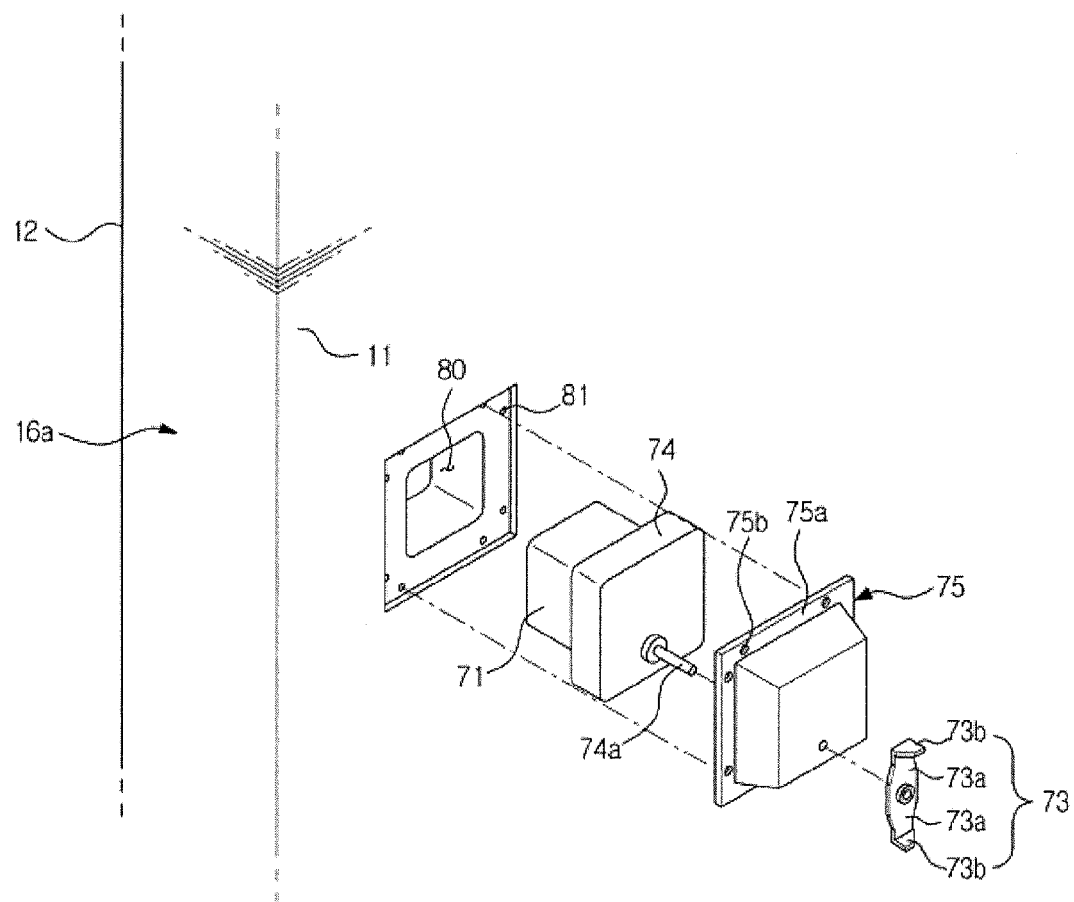
FIG. 3 is an exploded perspective view illustrating a driving device of the refrigerator depicted in FIG. 1.
Figure 4:
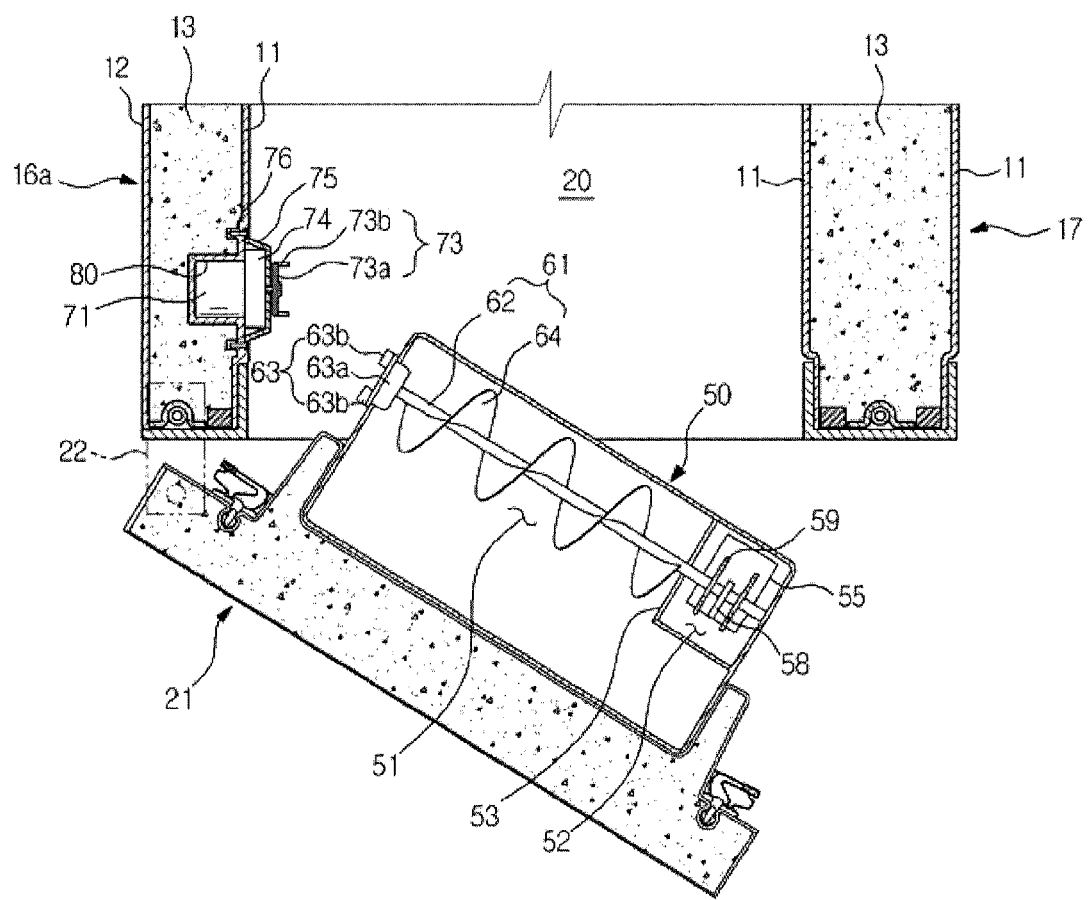
FIG. 4 is a plan sectional view of the refrigerator depicted in FIG. 1.
Figure 5:
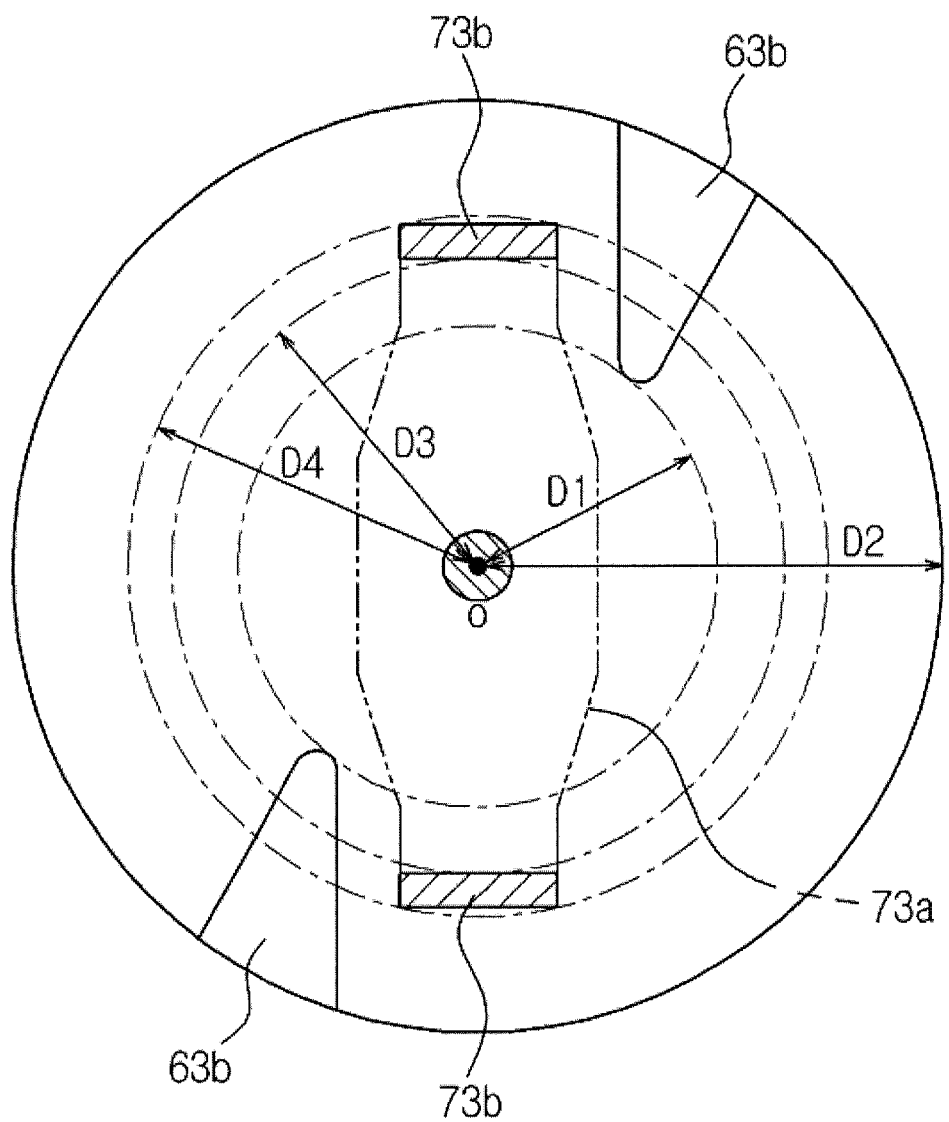
FIG. 5 is a sectional view illustrating a state in which a rotation center of a driven coupler and a rotation center of a driving coupler coincide with each other in the refrigerator depicted in FIG. 1.

FIG. 2 is a perspective view illustrating the door of the refrigerator depicted in FIG. 1, FIG. 3 is an exploded perspective view illustrating the driving device of the refrigerator depicted in FIG. 1, FIG. 4 is a plan sectional view of the refrigerator depicted in FIG. 1, and FIG. 5 is a sectional view illustrating a state in which a rotation center of a driven coupler and a rotation center of a driving coupler coincide with each other in the refrigerator depicted in FIG. 1.

Referring to FIGS. 2 through 5, the refrigerator according to the first embodiment of the present disclosure includes the icemaker 40, the ice bucket 50 to store ice cubes produced by the icemaker 40, the feeding device 61 and 63 to feed ice cubes stored in the ice bucket 50 and the driving device 70 to drive the feeding device 61 and 63.

The icemaker 40 may include plural ice making cells 41 to freeze water supplied thereto into ice cubes, an ejector 42 to separate the ice cubes produced in the ice making cells 41 from the icemaker 40 and a slider 43 to guide the ice cubes separated from the icemaker 40 through the ejector 42 to the ice bucket 50.

The ejector 42 may include a rotation shaft and an ejector pin extending in a radial direction from the rotation shaft. As the ejector pin rotates about the rotation shaft, the ice cubes in the ice making cells 41 are pushed to the outside of the ice making cells 41. The ice cubes separated from the ice making cells 41 by the ejector 42 may slide down to the ice bucket 50 through the slider 43.

The ice bucket 50 may include a storage space 51 to store the ice cubes dropping from the icemaker 40 and a crushing space 52 in which the ice cubes are crushed into ice pieces. The storage space 51 and the crushing space 52 may be horizontally arranged.

A discharge port 55 may be formed at a bottom portion of the crushing space 52, through which the ice pieces are discharged from the ice bucket 50. The discharge port 55 may be connected to a chute 90 to guide the ice pieces to a dispensing space of a dispenser.

A crushing device may be provided in the crushing space 52 to crush ice cubes into ice pieces. The crushing device may include a fixed blade 58 fixed to the ice bucket 50, a rotational blade 59 coupled to a rotation shaft 62 of a feeding unit 61 and configured to rotate together with the feeding unit 61 and a guide member 56 to hold the ice cubes so that the fixed blade 58 and the rotational blade 59 may crush the ice cubes into ice pieces and to guide the crushed ice pieces to the discharge port 55.

The guide member 56 may be rotatably coupled to the discharge port 55 by a hinge, to selectively allow ice cubes to be discharged through the discharge port 55 without being crushed. The crushing device may include a switching motor 57 capable of rotating the guide member 56.

The ice cubes dropping to the storage space 51 of the ice bucket 50 from the icemaker 40 may be fed to the crushing space 52 from the storage space 51 by the feeding device 61 and 63. The ice cubes may be selectively crushed into ice pieces or not crushed in the crushing space 52 and may be discharged to the outside of the ice bucket 50 through the discharge port 55 formed at the bottom portion of the crushing space 52.

The feeding device, which serves to feed ice cubes to the crushing space 52, may include a feeding unit 61 and a driven coupler 63 receiving driving force to rotate the feeding unit 61.

The feeding unit 61 may be formed in an auger configuration, which includes a rotation shaft 62 and a spiral blade 64 extending in a radial direction from the rotation shaft 62.

The driven coupler 63 may include a support part 63a extending in a radial direction from the rotation shaft 62 and a pressurized part 63b protruding from the support part 63a.

As exemplarily shown in FIG. 5, the pressurized part 63b includes a proximal end located apart from a rotation center O by a distance of a first radius D1 and a distal end located apart from the rotation center O by a distance of a second radius D2.

A driving coupler 73, which serves to rotate the driven coupler 63, may be provided at the main body 10. The driving coupler 73 includes a wing part 73a extending in radial direction from a rotation shaft and a pressurizing part 73b protruding from the wing part 73a. The pressurizing part 73b includes a proximal end and a distal end, at least one of which is located apart from the rotation center O by a distance between the first radius D1 and the second radius D2. As exemplarily shown in FIG. 5, the proximal end of the pressurizing part 73b may be spaced from the rotation center O by a distance of a third radius D3 and the distal end of the pressurizing part 73b may be spaced from the rotation center O by a distance of a fourth radius D4.

When the rotation centers of the driving coupler 73 and the driven coupler 63 are aligned with each other, if the driving coupler 73 rotates, the pressurizing part 73b of the driving coupler 73 pressurizes the pressurized part 63b of the driven coupler 63 and thus the driven coupler 63 rotates.

The driving coupler 73 and the driven coupler 63 are engaged with each other when the door 21 is closed and are disengaged from each other when the door 21 is opened. Accordingly, in order to prevent damage due to frequent engagement and disengagement, the driving coupler 73 and the driven coupler 63 may be made of a resin material.

As exemplarily shown in FIGS. 3 and 4, a driving motor 71 to rotate the driving coupler 73 may be provided at the side wall 16a of the main body 10. A reducer 74 to reduce rotation speed of the driving motor 71 may be connected to the driving motor 71, and the driving coupler 73 may be connected to an output shaft 74a of the reducer 74.

The inner casing 11 may be formed with a concave-shaped motor receiving part 80 which is depressed inside the insulation wall 13, so that at least a portion of the driving motor 71 may be received in the motor receiving part 80. As exemplarily shown in FIG. 4, the driving motor 71 may be wholly received in the motor receiving part 80.

By virtue of the motor receiving part 80 in which at least a portion of the driving motor 71 is received, the driving device 70 may not excessively protrude inside the freezing compartment 20, which may prevent decrease in the capacity of the freezing compartment 20 and interference with the driving device 70 when a user accesses the freezing compartment 20.

The driving motor 71 may be shielded by a cover 75. The cover 75 may include a coupling part 75a that comes into close contact with the inner casing 11 so as to be coupled to the inner casing 11. The coupling part 75a may be formed with a fastening hole 75b and the inner casing 11 may also be formed with a fastening hole 81 corresponding to the fastening hole 75b of the coupling part 75a. A fastening member 76 may be fastened to the fastening holes 75b and 81, thereby securely fixing the driving device 70 to the inner casing 11.

When the driving device 70 malfunctions, a user or technician may easily repair or replace the driving device 70 simply by releasing the fastening member 76 and separating the driving device 70 from the inner casing 11.

The driving device 70 is positioned such that the rotation center of the driving coupler 73 is aligned with the rotation center of the driven coupler 63 in the door-closed state.

Figure 6:
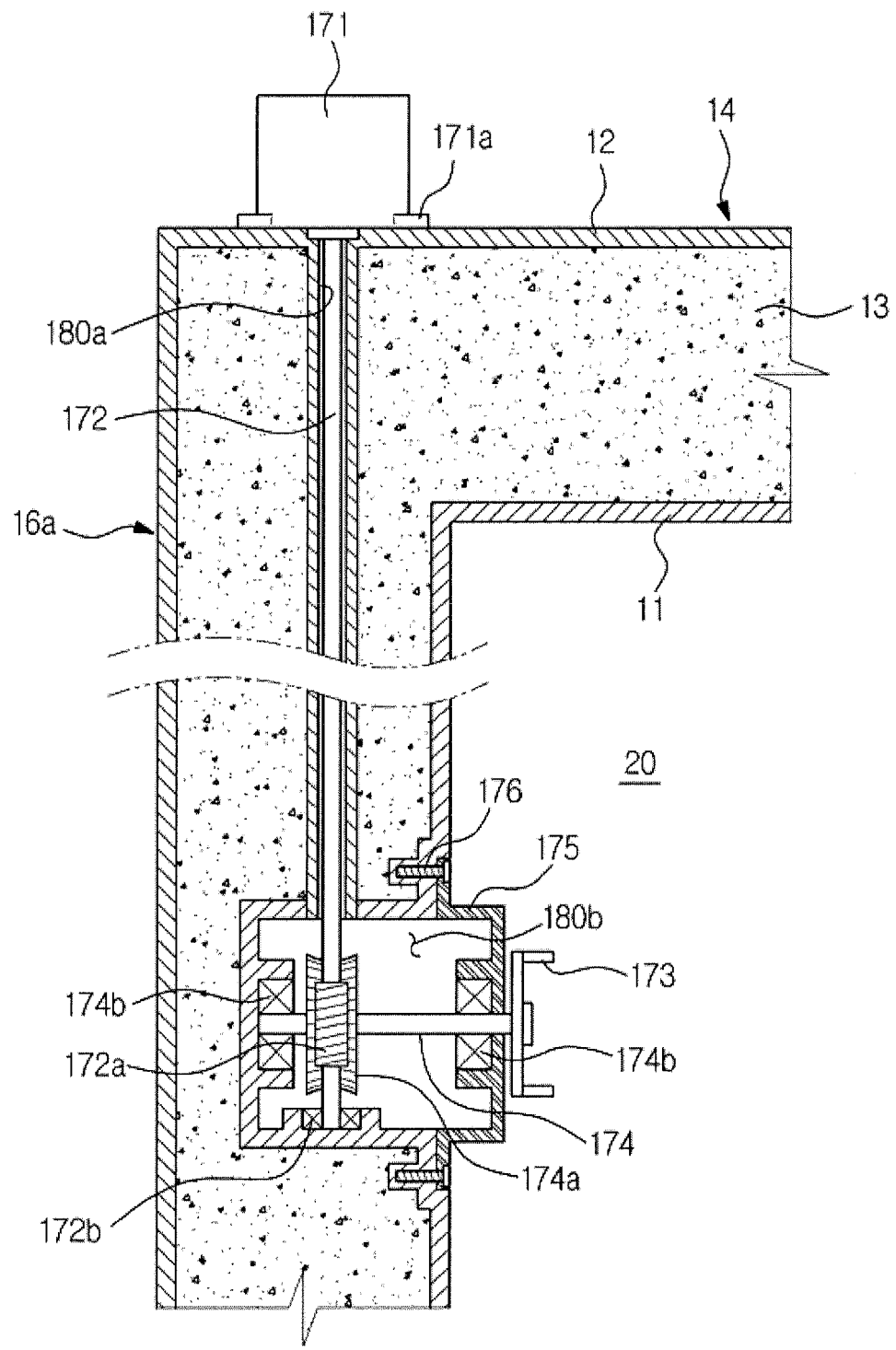
FIG. 6 is a side sectional view of a main body of a refrigerator according to a second embodiment of the present disclosure.
Figure 7:
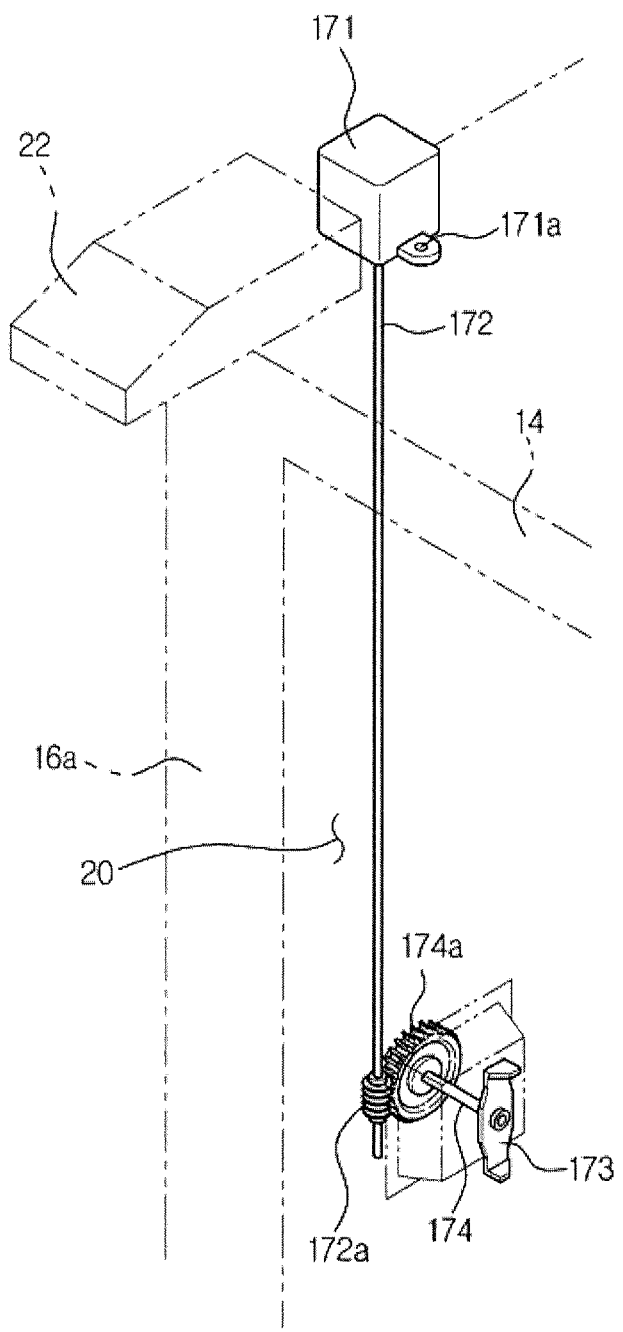
FIG. 7 is a perspective view illustrating a driving device of the refrigerator depicted in FIG. 6.

FIG. 6 is a side sectional view of a main body of a refrigerator according to a second embodiment of the present disclosure, and FIG. 7 is a perspective view illustrating a driving device of the refrigerator depicted in FIG. 6. Some parts in this embodiment are substantially the same as those in the first embodiment and thus denoted by the same reference numerals, and a detailed description thereof will be omitted.

As exemplarily shown in FIGS. 6 and 7, in a refrigerator according to the second embodiment of the present disclosure, a driving motor 171 is disposed at an outer surface of the outer casing 12 of the top wall 14. The driving motor 171 may be fixed to the outer surface of the outer casing 12 using a motor fastening part 171a. The motor fastening part 171a is not limited to the configuration illustrated in the drawings and may have various configurations capable of fixing the driving motor 171 to the outer surface of the outer casing 12.

An accommodation space 180a, in which a driving shaft 172 of the driving motor 171 is disposed, is formed between the inner casing 11 and the outer casing 12. The driving shaft 172 may extend downward from the top wall 14 through the accommodation space 180a.

The driving shaft 172 is arranged perpendicularly to a rotation shaft of a driving coupler 173. A worm gear 172a and 174a may be provided to transmit driving force of the driving shaft 172 to the driving coupler 173. Instead of the worm gear 172a and 174a, a bevel gear may be used. The structure of the worm gear 172a and 174a is capable of reducing rotation speed of the driving shaft 172 and thus does not require an additional reducer. Further, the worm gear 172a and 174a may have a smaller size than a bevel gear.

The worm gear 172a and 174a may include a worm 172a formed at the driving shaft 172 and a worm wheel 174a formed at a transmission shaft 174. The driving coupler 173 may be connected to the transmission shaft 174. The worm gear 172a and 174a may be disposed in an accommodation space 180b formed between the inner casing 11 and the outer casing 12.

Bearings 172b and 174b may be provided in the accommodation space 180b to enable the driving shaft 172 and the transmission shaft 174 to smoothly rotate. The accommodation space 180b may be covered by a cover 175. The cover 175 may be coupled to the inner casing 11 using a fastening member 176.

As described above, since this embodiment is structured such that the driving shaft 172 and the worm gear 172a and 174a are disposed in the spaces between the inner casing 11 and the outer casing 12 and are not exposed to the outside, the external appearance of the refrigerator is improved.

Figure 8:
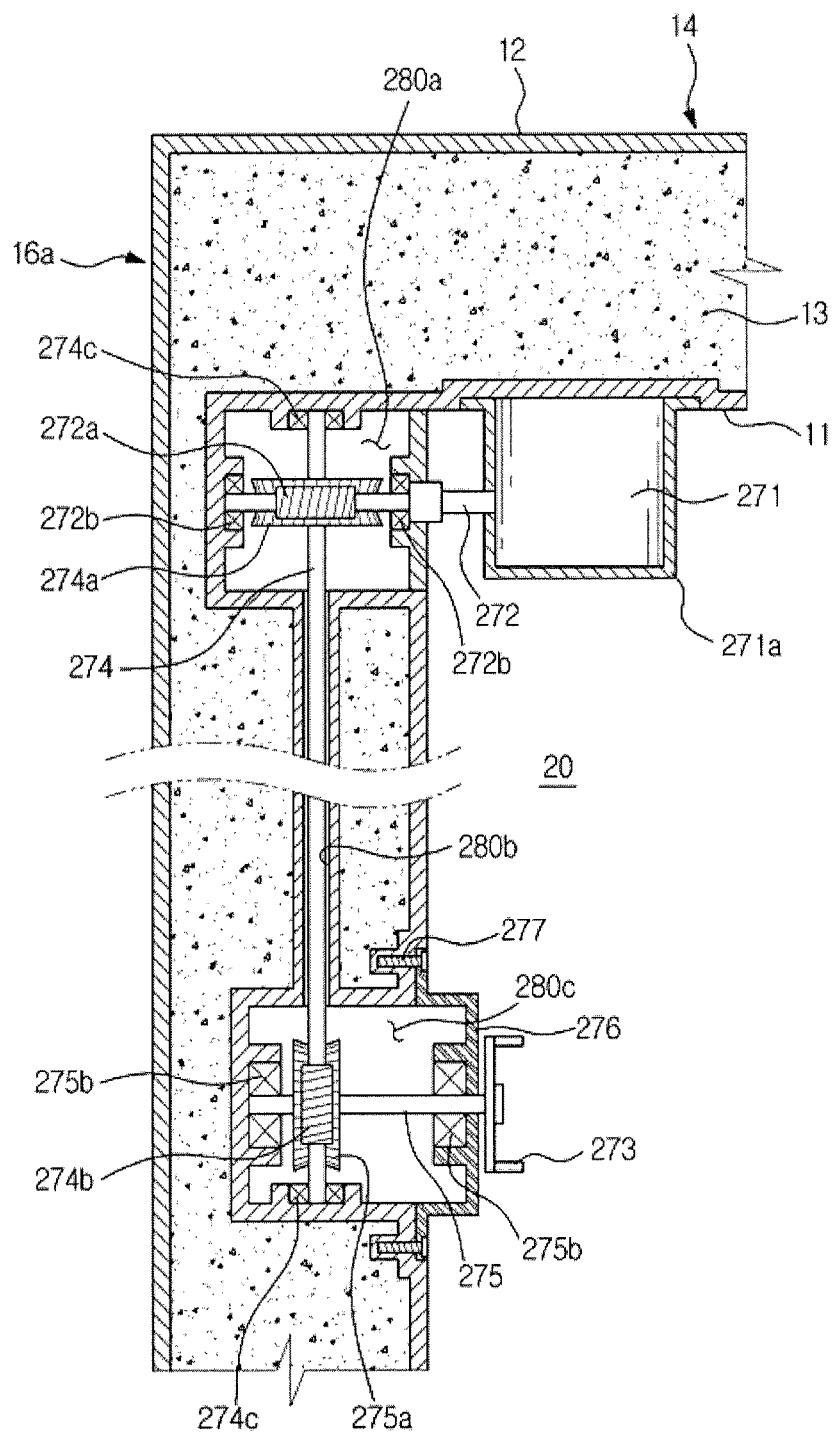
FIG. 8 is a side sectional view of a main body of a refrigerator according to a third embodiment of the present disclosure.

FIG. 8 is a side sectional view of a main body of a refrigerator according to a third embodiment of the present disclosure. Some parts in this embodiment are substantially the same as those in the first and second embodiments and thus denoted by the same reference numerals, and a detailed description thereof will be omitted.

As exemplarily shown in FIG. 8, in a refrigerator according to the third embodiment of the present disclosure, a driving motor 271 is disposed at an inner surface of the inner casing 11 of the top wall 14. The driving motor 271 may be fixed to the inner surface of the inner casing 11 using a motor fastening part 271a. The motor fastening part 271a is not limited to the configuration illustrated in the drawings.

A driving shaft 272 of the driving motor 271 may penetrate the inner casing 11 and may be disposed in a space between the inner casing 11 and the outer casing 12. The driving shaft 272 may be formed with a first worm 272a. The driving shaft 272 may also be coupled with a bearing 272b for smooth rotation thereof.

A first worm wheel 274a, which is engaged with the first worm 272a, may be formed at a first transmission shaft 274. The first worm 272a and the first worm wheel 274a may compose a first worm gear 272a and 274a. An accommodation space 280a to accommodate the first worm gear 272a and 274a may be formed between the inner casing 11 and the outer casing 12.

In addition, an accommodation space 280b may be formed between the inner casing 11 and the outer casing 12. The accommodation space 280b may extend vertically to accommodate the first transmission shaft 274. The first transmission shaft 274 may be coupled with a bearing 274c and may be formed with a second worm 274b.

A second worm wheel 275a, which is engaged with the second worm 274b, may be formed at a second transmission shaft 275. The second transmission shaft 275 may be connected with a driving coupler 273 and may be coupled with a bearing 275b. The second worm 274b and the second worm wheel 275a may compose a second worm gear 274b and 275a. An accommodation space 280c to accommodate the second worm gear 274b and 275a may be formed between the inner casing 11 and the outer casing 12.

The accommodation space 280c may be covered by a cover 276, and the cover 276 may be coupled to the inner casing 11 using a fastening member 277.

As described above, using the plural worm gears 272a, 274a, 274b and 275a, driving force from the driving motor 271 disposed at the inner surface of the inner casing 11 of the top wall 14 may be transmitted to the driving coupler 273. The driving force transmission structure is not limited to this embodiment using the plural worm gears 272a, 274a, 274b and 275a. Various other driving force transmission methods, using a single worm gear, a bevel gear, a belt-pulley system, or the like, may be applied, and such methods also fall within the scope of the present disclosure.

This embodiment has features that the worm gears 272a, 274a, 274b and 275a, the first transmission shaft 274 and the second transmission shaft 275 are disposed in the spaces between the inner casing 11 and the outer casing 12 and are not exposed to the outside. Further, the worm gears 272a, 274a, 274b and 275a eliminate the need for any additional reducer.

Figure 9:
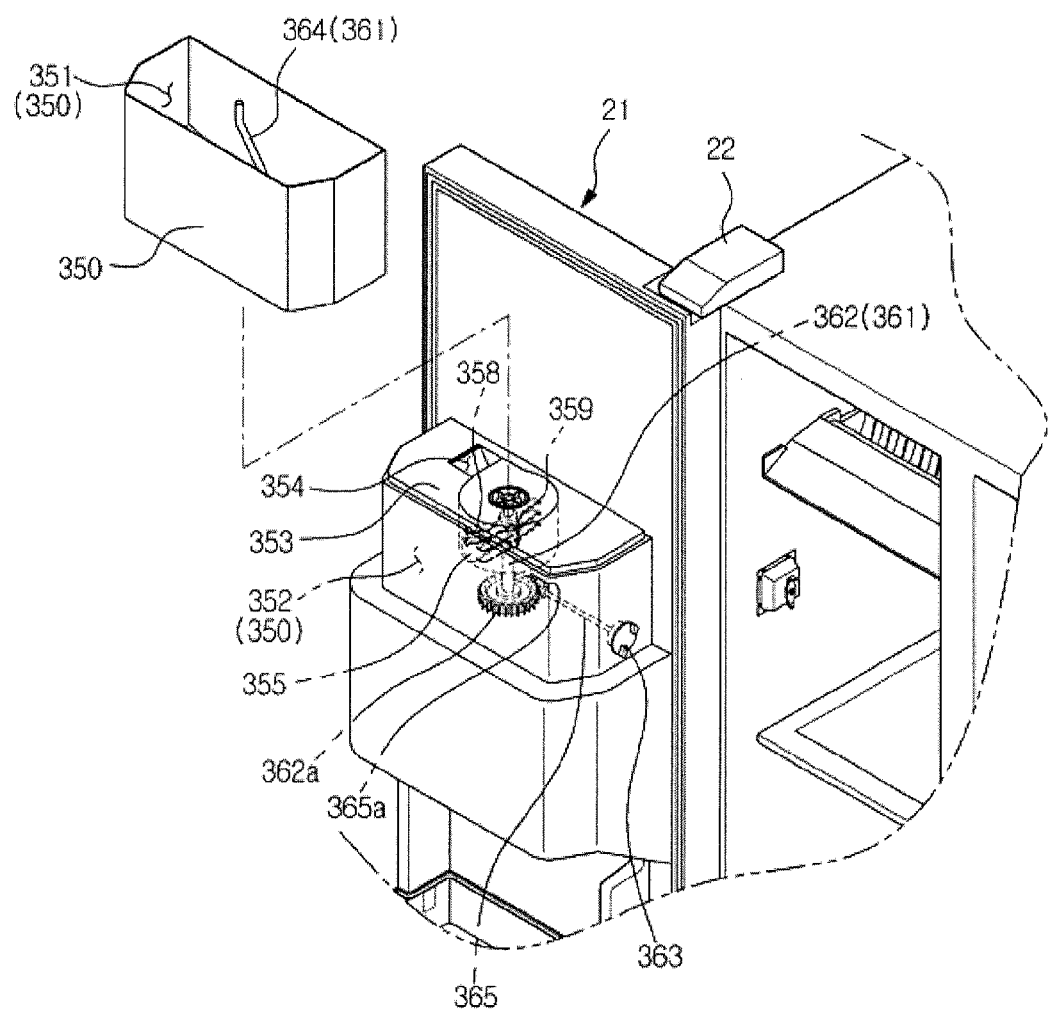
FIG. 9 is a perspective view illustrating a door of a refrigerator according to a fourth embodiment of the present disclosure.
Figure 10:
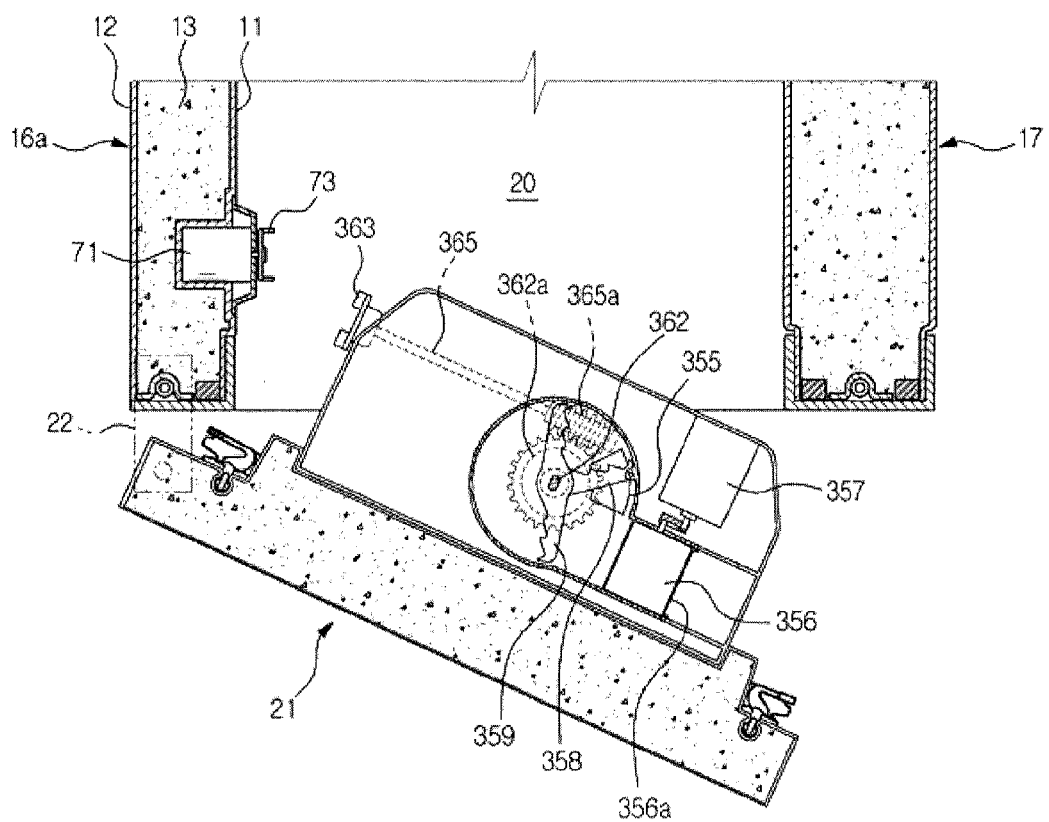
FIG. 10 is a plan sectional view of the refrigerator depicted in FIG. 9.

FIG. 9 is a perspective view illustrating a door of a refrigerator according to a fourth embodiment of the present disclosure, and FIG. 10 is plan sectional view of the refrigerator depicted in FIG. 9. Some parts in this embodiment are substantially the same as those in the first through third embodiments and thus denoted by the same reference numerals, and a detailed description thereof will be omitted.

As exemplarily shown in FIGS. 9 and 10, in a refrigerator according to the fourth embodiment of the present disclosure, a rotation shaft of a feeding unit 361 is vertically arranged. An ice bucket 350 includes a storage space 351 to store ice cubes produced by the icemaker and a crushing space 352 to which the ice cubes are fed from the storage space 351 and in which the ice cubes are crushed into ice pieces. The crushing space 352 is disposed below the storage space 351.

Although a separated state of the storage space 351 from the crushing space 352 is illustrated in FIG. 9, the storage space 351 and the crushing space 352 may be formed separately or integrally.

In the crushing space 352, there are provided a discharge port 355 through which ice pieces are discharged, a fixed blade 358 fixed to the ice bucket 350, a rotational blade 359 configured to rotate together with the feeding unit 361, and a guide member 356 to hold the ice cubes so that the fixed blade 358 and the rotational blade 359 may crush the ice cubes into ice pieces and to guide the crushed ice pieces to the discharge port 355. The guide member 356 may rotate about a hinge shaft 356a by a switching motor 357.

The storage space 351 and the crushing space 352 are partitioned by a partition plate 353. The partition wall 353 is formed with a communication hole 354 to communicate the storage space 351 and the crushing space 352 with each other. The partition plate 353 is horizontally arranged. Accordingly, a rotation shaft 362 of the feeding unit 361 may be vertically arranged.

The feeding unit 361 may include a rotation shaft 362 and a stirrer 364 provided above the rotation shaft 362 so as to stir ice cubes in the storage space 351 and feed the same to the crushing space 352 through the communication hole 354 while preventing the communication hole 354 from becoming blocked.

The rotation shaft 362 may be formed with a worm wheel 362a, and a worm 365a engaged with the worm wheel 362a may be formed at a transmission shaft 365. The transmission shaft 365 may be connected with a driven coupler 363.

As described above, by using the worm gear 362a and 365a, driving force may be transmitted from the driven coupler 363 to the feeding unit 361 having the vertically arranged rotation shaft 362.

Figure 11:
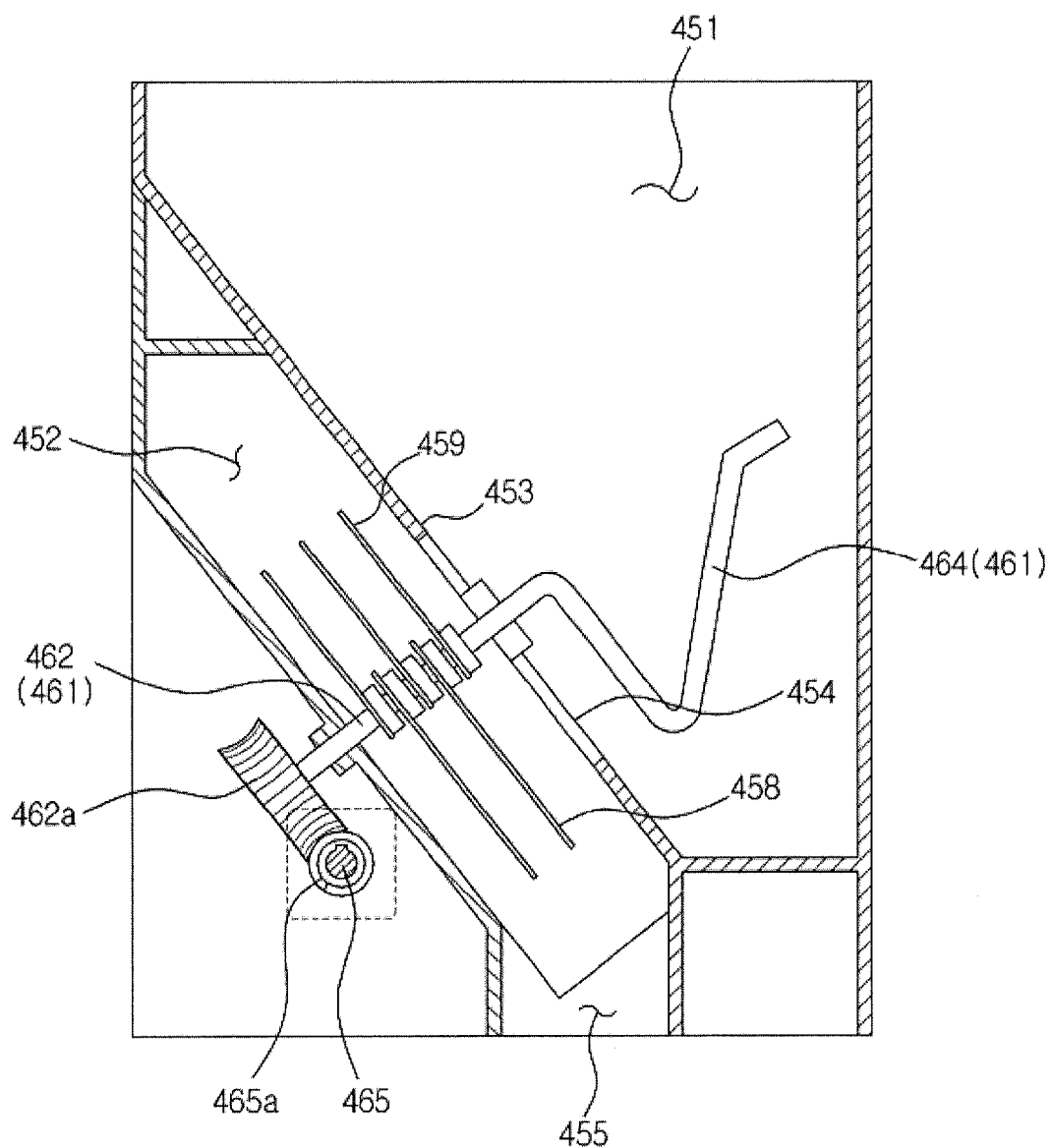
FIG. 11 is a view to explain a refrigerator according to a fifth embodiment of the present disclosure.

FIG. 11 is a view to explain a refrigerator according to a fifth embodiment of the present disclosure. Some parts in this embodiment are substantially the same as those in the first through fourth embodiments and thus denoted by the same reference numerals, and a detailed description thereof will be omitted.

As exemplarily shown in FIG. 11, in a refrigerator according to the fifth embodiment of the present disclosure, a rotation shaft of a feeding unit 461 is slantedly arranged. An ice bucket 451 and 452 includes a storage space 451 to store ice cubes produced by the icemaker and a crushing space 452 to which the ice cubes are fed from the storage space 451 and in which the ice cubes are crushed into ice pieces. A partition plate 453 to partition the storage space 451 and the crushing space 452 is slantedly arranged. The partition plate 453 may be formed with a communication hole 454 to communicate the storage space 451 and the crushing space 452 with each other.

The feeding unit 461 may include a rotation shaft 462 arranged slantedly with respect to a horizontal plane or perpendicularly to the partition plate 453 and a stirrer 464 provided above the rotation shaft 462 so as to stir ice cubes in the storage space 451 and feed the same to the crushing space 452 through the communication hole 454 while preventing the communication hole 454 from becoming blocked.

The rotation shaft 462 of the feeding unit 461 may be formed with a worm wheel 462a, and a worm 465a engaged with the worm wheel 462a may be formed at a transmission shaft 465.

Figure 12:
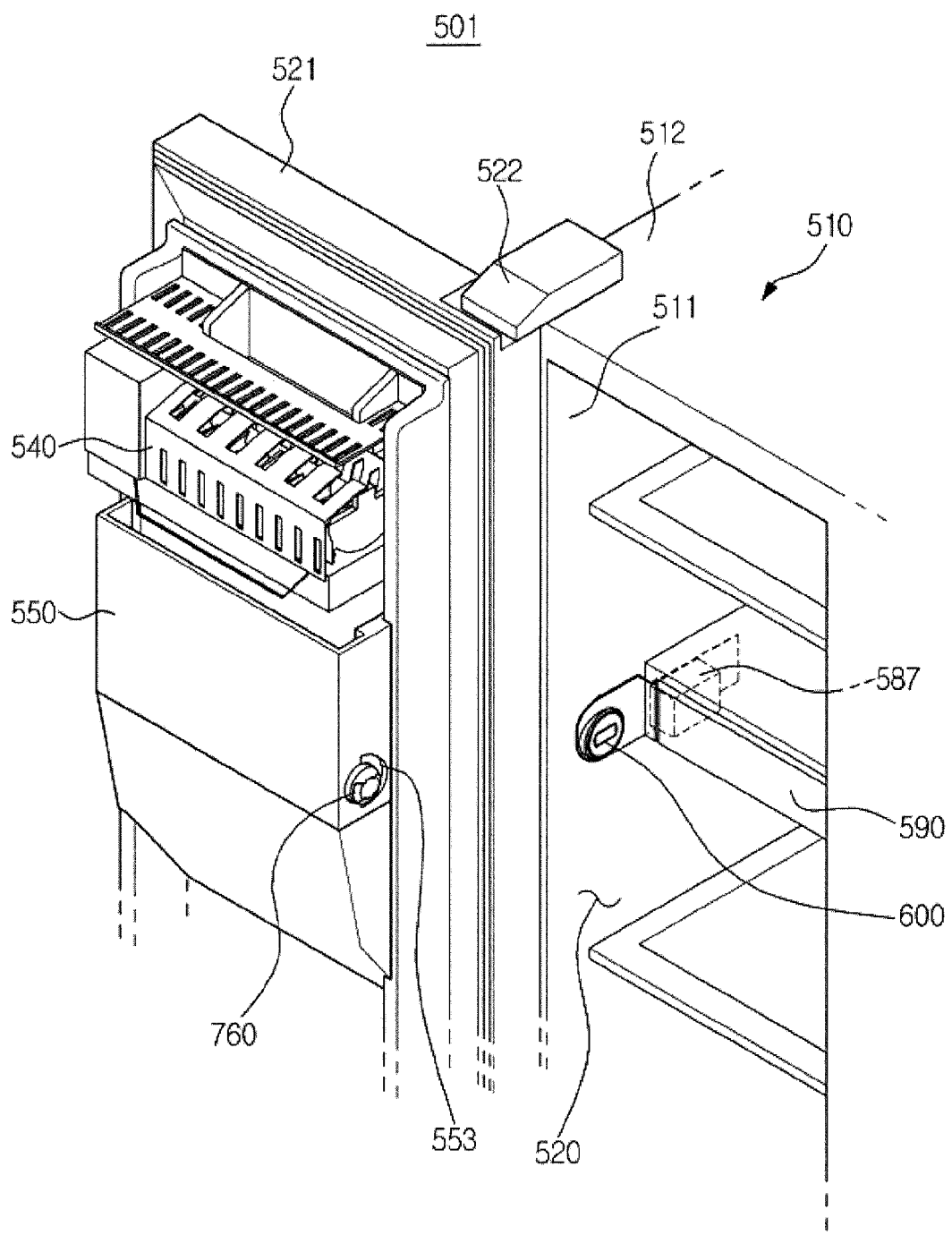
FIG. 12 is a view illustrating a refrigerator according to a sixth embodiment of the present disclosure.
Figure 13:
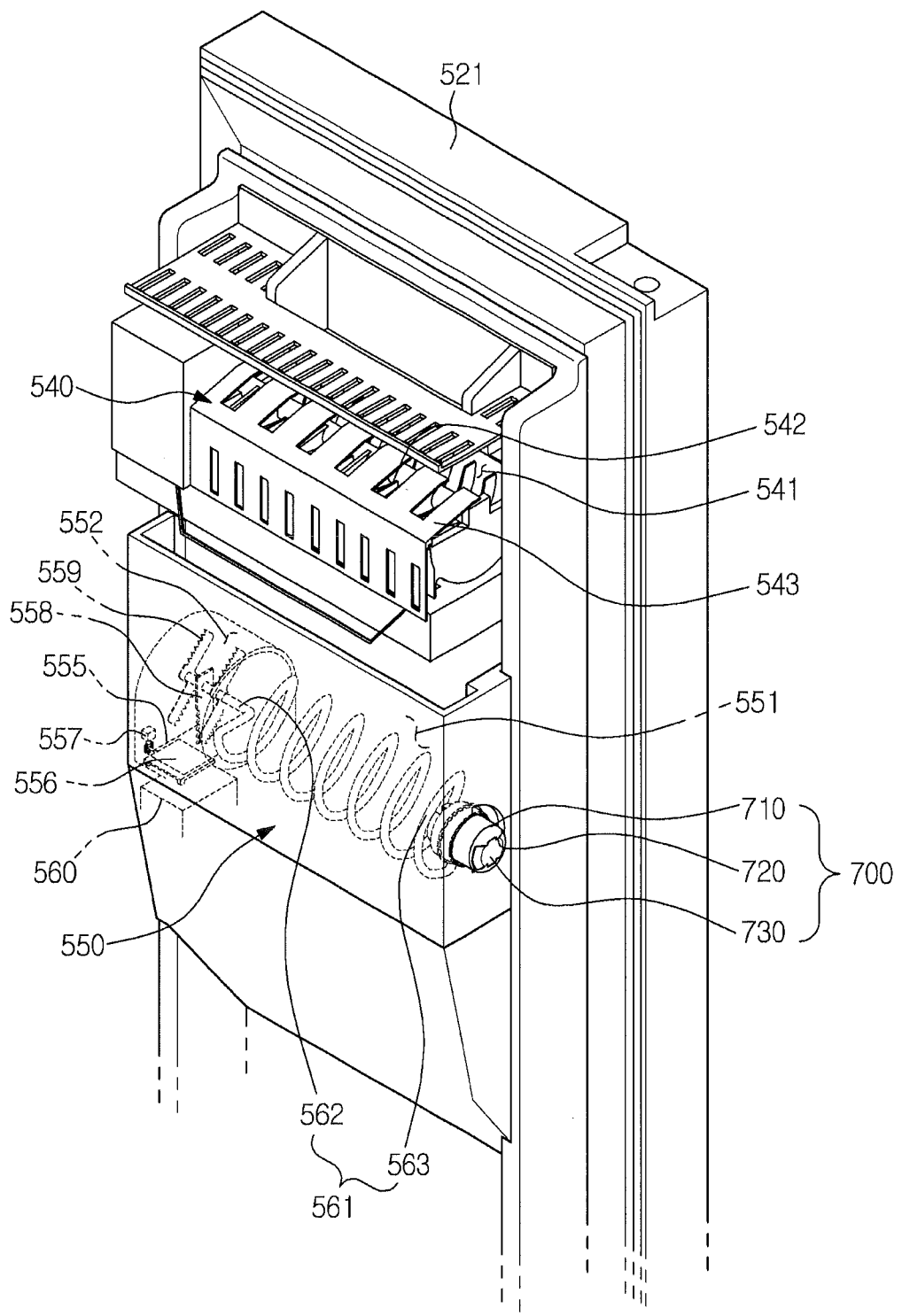
FIG. 13 is a view illustrating a rear of a door of the refrigerator depicted in FIG. 12.

FIG. 12 is a view illustrating a refrigerator according to a sixth embodiment of the present disclosure, and FIG. 13 is a view illustrating a rear of a door of the refrigerator depicted in FIG. 12. Some parts in this embodiment are substantially the same as those in the first through fifth embodiments and thus denoted by the same reference numerals, and a detailed description thereof will be omitted.

As exemplarily shown in FIGS. 12 and 13, a refrigerator 501 according to the sixth embodiment of the present disclosure includes a main body 510, a storage compartment 520 formed in the main body 510 and a cool air supply device (not shown) to supply cool air to the storage compartment 520. The cool air supply device may maintain a temperature of the storage compartment 520 below zero. That is, the storage compartment 520 may be a freezing compartment.

The main body 510 includes an inner casing 511 to define the storage compartment 520, an outer casing 512 coupled outside of the inner casing 511 and an insulation wall 513 (refer to FIG. 18) disposed between the inner casing 511 and the outer casing 512. The insulation wall 513 may be formed of rigid urethane foam, or may be formed by injecting a raw urethane material into a space between the inner casing 511 and the outer casing 512 that are coupled to each other.

A door 521 may be rotatably coupled to the main body 510 by a hinge 522, so as to open and close an opened front surface of the storage compartment 520. The door 521 is provided with an icemaker 540 to produce ice cubes and an ice bucket 550 to store ice cubes produced by the icemaker 540. The icemaker 540 may produce ice cubes using cool air in the storage compartment 520.

The icemaker 540 may include plural ice making cells 541 to freeze water supplied thereto into ice cubes, an ejector 542 to separate the ice cubes produced in the ice making cells 541 from the icemaker 540 and a slider 543 to guide the ice cubes separated from the icemaker 540 through the ejector 542 to the ice bucket 550.

The ice bucket 550 is provided at a rear of the door 521 and is positioned below the icemaker 540. The ice bucket 550 may include a storage space 551 to store the ice cubes dropping from the icemaker 540 and a crushing space 552 in which the ice cubes are crushed into ice pieces.

The storage space 551 and the crushing space 552 may be horizontally arranged next to each other. A discharge port 555 may be formed at a bottom portion of the crushing space 552, through which the ice pieces are discharged from the ice bucket 550. The discharge port 555 may be connected to a chute 560 to guide the ice pieces to a dispensing space of a dispenser.

The ice bucket 550 may be provided with a feeding device 561 and 700 to feed ice cubes and a crushing device 556, 557, 558 and 559 to crush the ice cubes into ice pieces.

The feeding device may include a feeding unit 561 and a driven coupler 700 to which driving force to rotate the feeding unit 561 is transmitted. The driven coupler 700 is disposed outside of the ice bucket 550, and the feeding unit 561 may be connected to the driven coupler 700 through an opening 553 of the ice bucket 550.

The feeding unit 561 may include a rotation shaft 562 and a helix 563 extending from the rotation shaft 562.

The driven coupler 700 may include a second coupling unit 710 formed with an insertion recess 720 and a second cover 730 provided in the insertion recess 720 so as to hide the insertion recess 720. A detailed constitution of the driven coupler 700 will be explained later.

The crushing device may include a fixed blade 558 fixed to the ice bucket 550, a rotational blade 559 coupled to the rotation shaft 562 of the feeding unit 561 and configured to rotate together with the feeding unit 561 and a guide member 556 to hold the ice cubes so that the fixed blade 558 and the rotational blade 559 may crush the ice cubes into ice pieces. The guide member 556 may be rotatably coupled to the discharge port 555 by a hinge and may rotate by a switching motor 557 to selectively allow the ice cubes to be discharged through the discharge port 555 without being crushed.

The main body 510 is provided with a driving device to drive the feeding device and the crushing device.

The driving device includes a driving motor 571 (refer to FIG. 17) to generate driving force and a driving coupler 600 to transmit the driving force from the driving motor 571 to the feeding device.

When the door 521 is opened, the driving coupler 600 and the driven coupler 700 are disengaged from each other. When the door 521 is closed, the driving coupler 600 and the driven coupler 700 are engaged with each other and, accordingly, driving force transmission therebetween is accomplished.

The refrigerator according to the sixth embodiment of the present disclosure has features that the driving coupler 600 and the driven coupler 700 are smoothly engaged with each other when the door 521 is closed, the external appearance and aesthetics in the door-opened state is improved and the risk of injury from direct contact of a body of a user with the driving and driven couplers 600 and 700 is prevented. Constitution of the driving coupler 600 and the driven coupler 700 will now be described.

Figure 14:
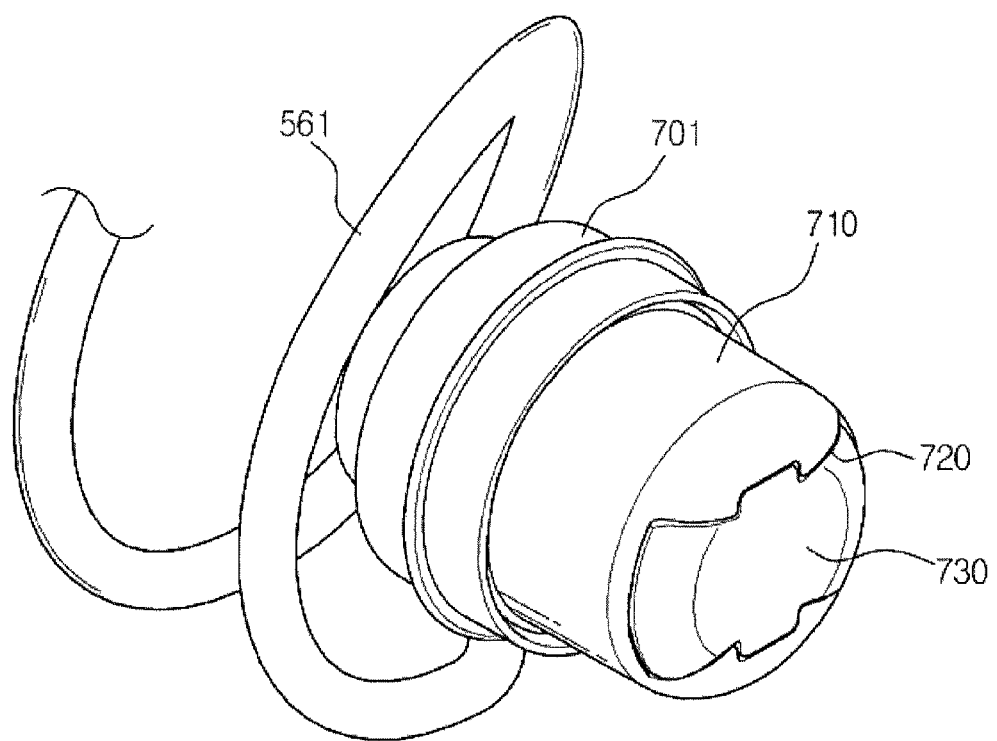
FIG. 14 is an exploded perspective view of a driving device of the refrigerator depicted in FIG. 12.
Figure 15:
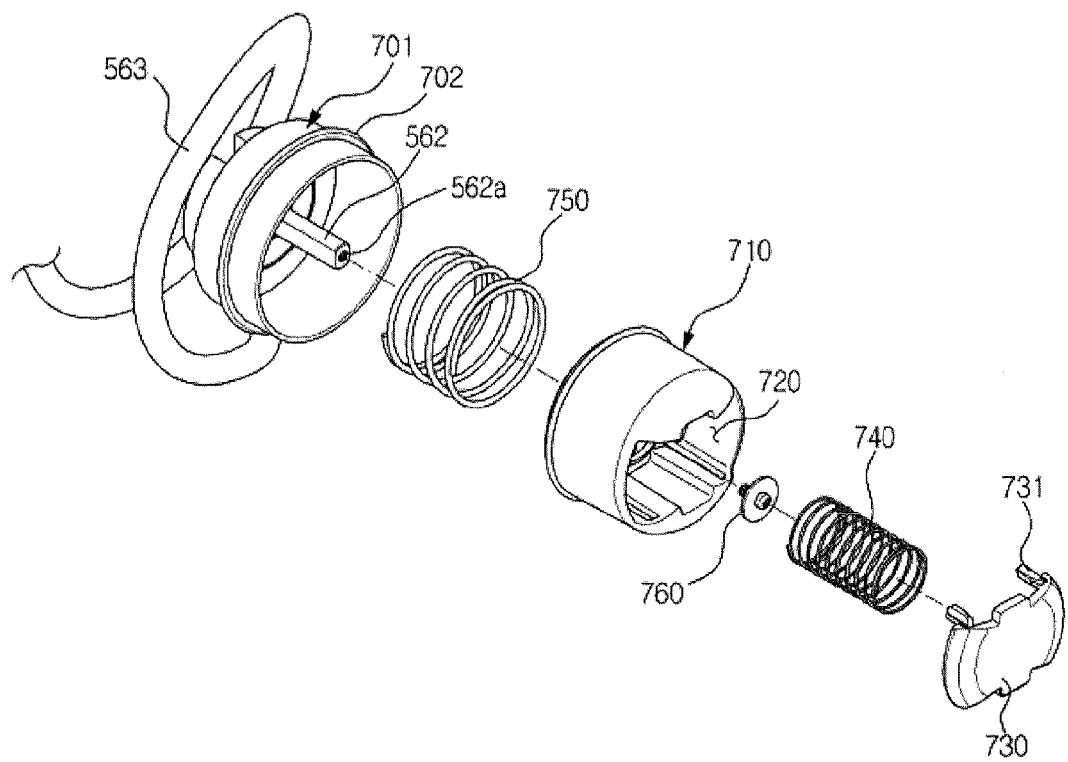
FIG. 15 is a sectional view of a driving coupler of the refrigerator depicted in FIG. 12.

FIG. 14 is an exploded perspective view illustrating the driving device of the refrigerator depicted in FIG. 12, and FIG. 15 is a sectional view of the driving coupler of the refrigerator depicted in FIG. 12.

As exemplarily shown in FIGS. 14 and 15, the driving device of the refrigerator according to the sixth embodiment of the present disclosure includes a driving motor 571 to generate driving force and a driving coupler 600 to transmit the driving force from the driving motor 571 to the feeding device.

The driving force of the driving motor 571 is transmitted to a driving shaft 572 with a rotation speed of the driving motor 571 being adequately reduced by a transmission part 575. The transmission part 575 may include a reduction gear or belt.

The driving coupler 600 may be configured to be coupled to the driving shaft 572 and rotate together with the driving shaft 572. The driving coupler 600 may be coupled to the driving shaft 572 through a connection bracket 573.

The connection bracket 573 may have a substantial U shape and may be coupled to the driving shaft 572 so as to rotate together with the same. The driving shaft 572 may have a rectangular cross section, and the connection bracket 573 may be formed with a rectangular shaft hole, through which the driving shaft 572 is inserted. The driving shaft 572 may be coupled via a nut 574 to fix the connection bracket 573 to the driving shaft 572.

The driving coupler 600 may include a first coupling unit 610, a first cover 630 and a first spring 640. The first coupling unit 610 may be coupled to the connection bracket 573 so as to rotate together with the same.

The first coupling unit 610 may include a circular plate part 611 formed in a substantially circular-plate shape and an insertion protrusion 620 protruding from the circular plate part 611. The circular plate part 611 may be formed with a spring support part 612 to support the first spring 640.

The insertion protrusion 620 may be inserted into an insertion recess 720 formed at a second coupling unit 710 of the driven coupler 700, which will be described later. In the inserted state of the insertion protrusion 620 into the insertion recess 720, if the driving motor 571 is driven, rotational force of the driving motor 571 is transmitted to the feeding device.

The first cover 630 serves to hide the insertion protrusion 620 so as not to be exposed to the outside when the door 521 is opened. Here, "to hide" means to cause the insertion protrusion 620 to appear not to protrude from the surrounding objects. That is, the first cover 630 moves to a position on an identical plane to a front surface portion of the insertion protrusion 620, so that a side surface portion of the insertion protrusion 620 is not exposed.

Such a structure of hiding the insertion protrusion 620 may improve the external appearance and aesthetics, prevent injury from direct contact of a body of a user with the insertion protrusion 620 and enhance convenience in use.

The first cover 630 is formed with an opening 631 through which the insertion protrusion 620 passes. So as to hide or expose the insertion protrusion 620, the first cover 630 is provided movably forward and backward around the insertion protrusion 620 in an axial direction of the motor driving shaft 572.

The first cover 630 may be elastically supported by the first spring 640. As exemplarily shown in the drawings, the first spring 640 may be provided in two separate parts disposed adjacent to both sides of the insertion protrusion 620. The first spring 640 elastically biases the first cover 630 in order to hide the insertion protrusion 620. The first spring 640 may be configured as a compression coil spring.

The first cover 630 may move backward in the axial direction by being pressurized by the second coupling unit 710 of the driven coupler 700, which will be described later. Accordingly, the insertion protrusion 620 may be exposed to the outside. If the pressurization is released, the first cover 630 may return to a position of hiding the insertion protrusion 620 by elastic restoring force of the first spring 640.

The refrigerator may further include a motor housing 581 and 585 to accommodate the driving motor 571. The motor housing 581 and 585 may include a first motor housing 581 and a second motor housing 585.

The first motor housing 581 is disposed inside of the insulation wall 513 between the inner casing 511 and the outer casing 512. Therefore, the first motor housing 581 may be supported by the inner casing 511 and the insulation wall 513. The first motor housing 581 has an opening directed toward the storage compartment 520.

Before injecting an insulation material, the first motor housing 581 is temporarily fixed to the inner casing 511. Then, the insulation material is injected into the space between the inner casing 511 and the outer casing 512, thereby securely fixing the first motor housing 581 to the inner casing 511 through adhesive force of the insulation material itself.

The second motor housing 585 is coupled to the first motor housing 581 to cover the opening of the first motor housing 581. The second motor housing 585 and the first motor housing 581 have coupling holes 589 and 582 respectively, and are coupled to each other by fastening a fastening member, such as a screw, to the coupling holes 589 and 582.

The second motor housing 585 has a protruding part 587 protruding toward the storage compartment 520 so as to define an accommodation space 586 to accommodate the driving motor 571.

In addition, the second motor housing 585 is formed with an opening 588, through which the second coupling unit 710 passes when the first coupling unit 610 and the second coupling unit 710 are coupled.

In the storage compartment 520, there may be provided a mini-drawer 590 to store thin or small food items. The mini-drawer 590 may be designed to hide the protruding part 587 of the second motor housing 585 so as not to be exposed to the outside, thereby improving the external appearance.

Figure 16:
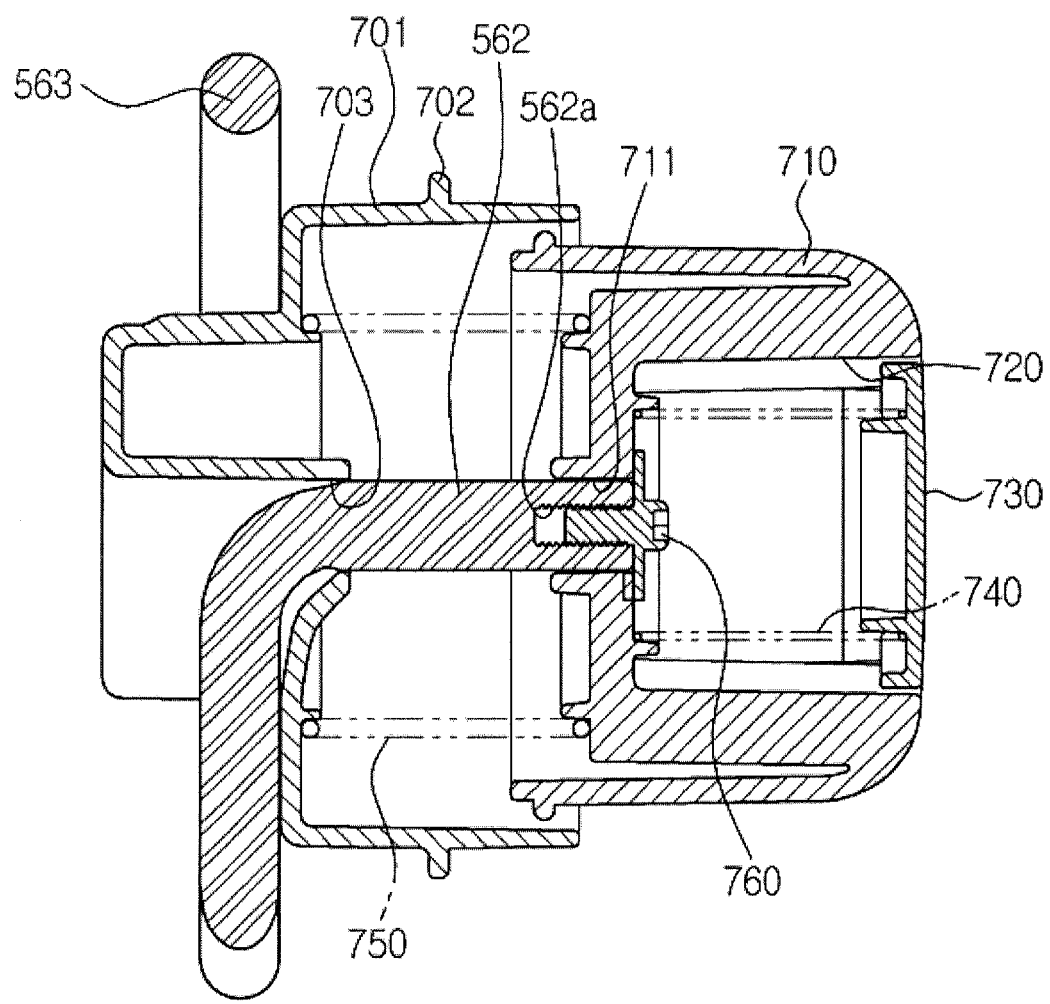
FIG. 16 is a view illustrating a driven coupler of the refrigerator depicted in FIG. 12.
Figure 17:
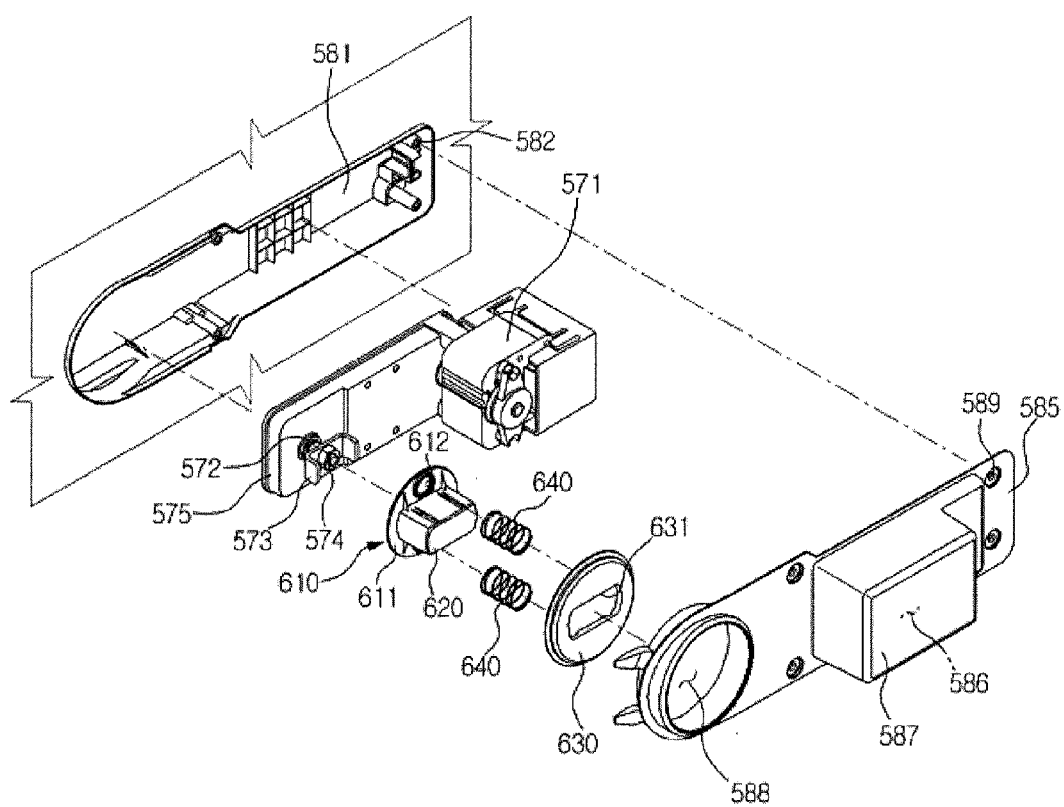
FIG. 17 is an exploded perspective view of the driven coupler of the refrigerator depicted in FIG. 12.
Figure 18:
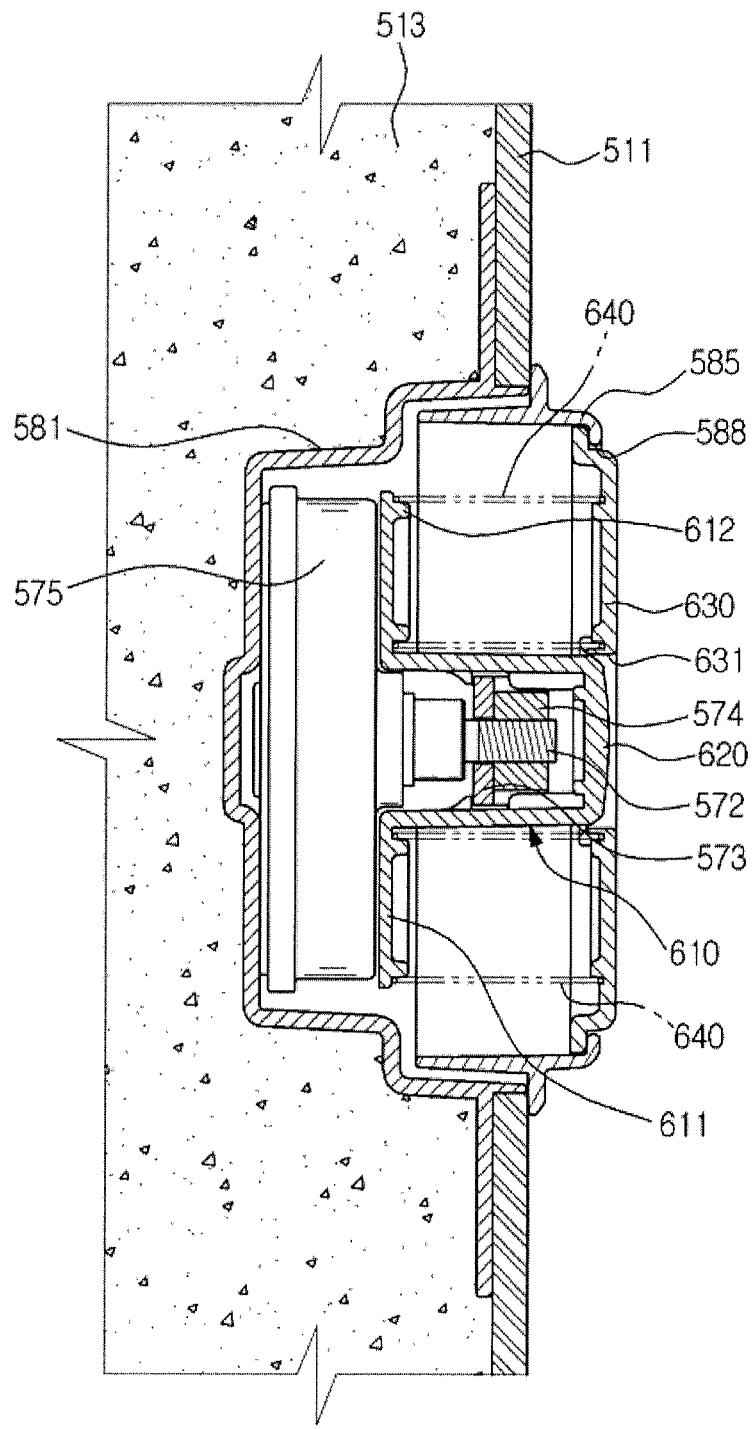
FIG. 18 is a sectional view of the driven coupler of the refrigerator depicted in FIG. 12.

FIG. 16 is a view illustrating the driven coupler of the refrigerator depicted in FIG. 12, FIG. 17 is an exploded perspective view of the driven coupler of the refrigerator depicted in FIG. 12, and FIG. 18 is a sectional view of the driven coupler of the refrigerator depicted in FIG. 12.

Referring to FIGS. 16 through 18, the driven coupler may include a base part 701, a second coupling unit 710, a second cover 730, a second spring 740, and a third spring 750.

The base part 701 is formed in a substantially cylindrical shape having an opening at one side. The base part 701 serves to support the second coupling unit 710 and the third spring 750, and is coupled to the rotation shaft 562 of the feeding unit so as to rotate together with the same. The rotation shaft 562 of the feeding unit may have a rectangular cross section, and the base part 701 may be formed with a rectangular shaft hole 703, through which the rotation shaft 562 is inserted. The base part 701 may be provided with a flange part 702 protruding from an outer circumferential surface thereof. The flange part 702 is supported by the ice bucket 550 and serves to fix the position of the base part 701.

The second coupling unit 710 serves to receive driving force by being coupled to the first coupling unit 610 of the driving coupler. The second coupling unit 710 includes a body part and an insertion recess 720 formed at the body part.

The insertion protrusion 620 of the first coupling unit 610 is inserted into the insertion recess 720 of the second coupling unit 710. Thus, the insertion recess 720 may have a cross-sectional shape substantially identical to or larger than the insertion protrusion 620.

Here, the coupling of the first coupling unit 610 and the second coupling unit 710 means insertion of the insertion protrusion 620 of the first coupling unit 610 into the insertion recess 720 of the second coupling unit 710.

The second coupling unit 710 is formed with a shaft hole 711 into which the rotation shaft 562 of the feeding unit is fitted and is coupled to the rotation shaft 562 of the feeding unit so as to rotate together with the same. The rotation shaft 562 of the feeding unit may have a rectangular cross section, and the shaft hole 711 may also have a rectangular shape.

The second cover 730 serves to hide the insertion recess 720 so as not to be exposed to the outside when the door 521 is opened, by moving to a position on an identical plane to a front surface portion of the second coupling unit 710. Here, "to hide" means to cause the second coupling unit 710 to appear not to be formed with the insertion recess 720 when viewed from the outside.

Such a structure of hiding the insertion recess 720 may improve the external appearance and aesthetics and prevent inconvenience or injury to fingers of a user caused by becoming caught in the insertion recess 720 during use of the refrigerator.

So as to hide or expose the insertion recess 720, the second cover 730 is provided movably forward and backward in the insertion recess 720 in an axial direction of the rotation shaft 562 of the feeding unit.

A guide leg 731 may be provided at a rear surface of the second cover 730, in order to guide movement of the second cover 730 and prevent separation of the second cover 730.

The second cover 730 may be elastically supported by the second spring 740. That is, the second spring 740 elastically biases the second cover 730 in order to hide the insertion recess 720. The second spring 740 may be configured as a compression coil spring.

The second cover 730 may move backward into the insertion recess 720 through pressurization provided by the insertion protrusion 620 of the first coupling unit 610. If the pressurization is released, the second cover 730 may return to a position of hiding the insertion recess 720 by elastic restoring force of the second spring 740.

When the door 521 is closed, the insertion protrusion 620 of the first coupling unit 610 is directly inserted into the insertion recess 720 of the second coupling unit 710. However, the insertion protrusion 620 of the first coupling unit 610 may not be directly inserted into the insertion recess 720 of the second coupling unit 710 and may collide with the body part of the second coupling unit 710.

Whether the insertion protrusion 620 of the first coupling unit 610 is directly inserted into the insertion recess 720 of the second coupling unit 710 or collides with the body part of the second coupling unit 710 depends on the position of the insertion protrusion 620 of the first coupling unit 610 and the position of the insertion recess 720 of the second coupling unit 710 when the door 521 is closed.

Such collision between the insertion protrusion 620 of the first coupling unit 610 and the body part of the second coupling unit 710 may cause shock and damage to the components. Further, because the first coupling unit 610 and the second coupling unit 710 are not completely coupled, the feeding device may not operate normally, or the door may not be closed completely.

Accordingly, the refrigerator according to the sixth embodiment of the present disclosure is equipped with a coupling device capable of preventing shock due to accidental collision between the insertion protrusion 620 of the first coupling unit 610 and the body part of the second coupling unit 710, enabling the door to be completely closed and guiding the insertion protrusion 620 of the first coupling unit 610 to be fully inserted into the insertion recess 720 of the second coupling unit 710 if the driving motor 571 is driven in the collision state.

In order to achieve the above objectives, the second coupling unit 710 is provided movably forward and backward in an axial direction of the rotation shaft 562 of the feeding unit. The second coupling unit 710 is elastically supported by the third spring 750.

When the door 521 is closed, if the insertion protrusion 620 of the first coupling unit 610 collides with the body part of the second coupling unit 710 and pressurizes the second coupling unit 710, the second coupling unit 710 moves backward into the base part 701 against elastic force of the third spring 750.

Subsequently, if the driving motor 571 is driven, the insertion protrusion 620 of the first coupling unit 610 rotates. If the insertion protrusion 620 of the first coupling unit 610 rotates to a certain extent and the position of the insertion protrusion 620 is aligned with the position of the insertion recess 720, the second coupling unit 710 moves forward out of the base part 701 by elastic restoring force of the third spring 750 and eventually the insertion protrusion 620 of the first coupling unit 610 is inserted into the insertion recess 720 of the second coupling unit 710.

The rotation shaft 562 of the feeding unit may be formed with a coupling hole 562a at an end portion thereof, and a separation-prevention member 760 may be coupled into the coupling hole 562a in order to limit movement of the second coupling unit 710.

Figure 19:
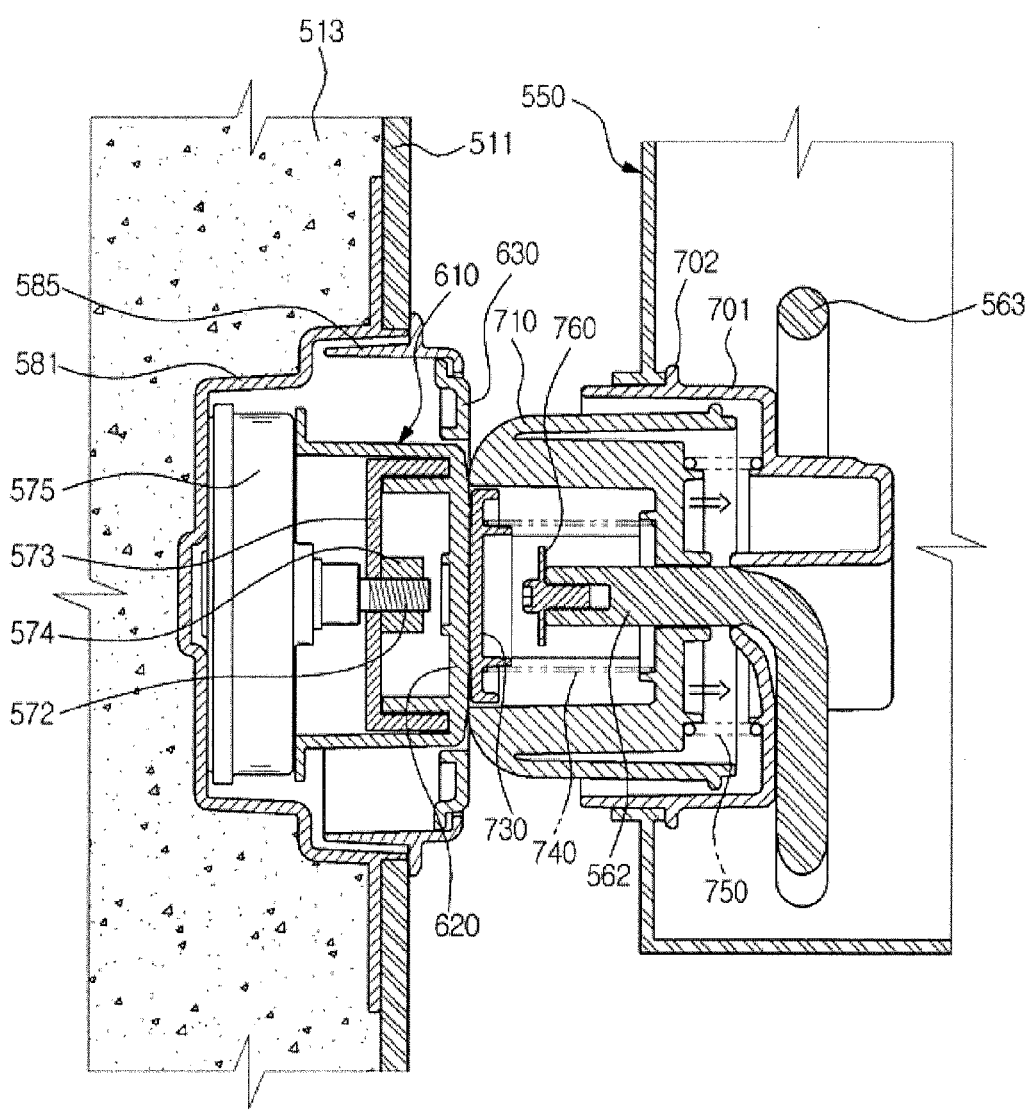
FIG. 19 is a sectional view illustrating a state in which a first coupling unit of the driving coupler pressurizes a second coupling unit of the driven coupler in the refrigerator depicted in FIG. 12.
Figure 20:
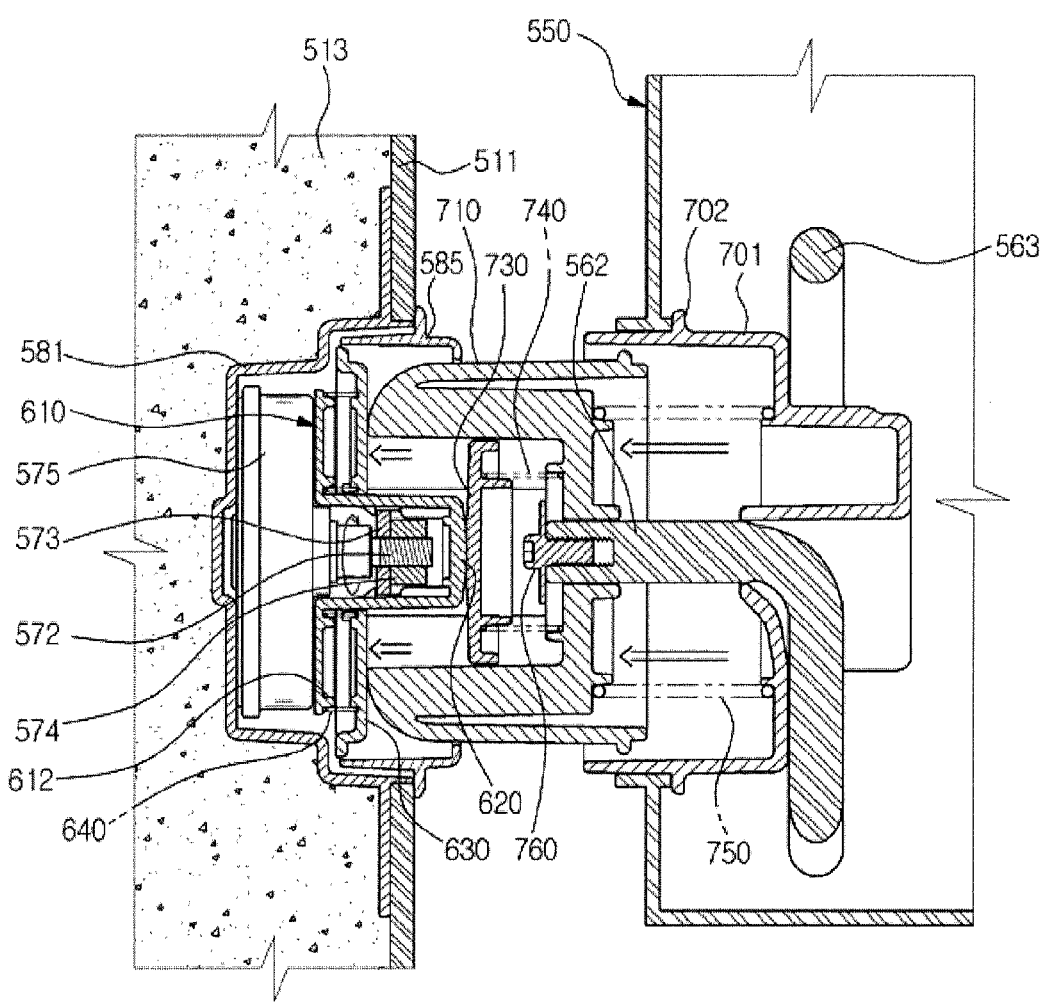
FIG. 20 is a sectional view illustrating a state in which an insertion protrusion of the first coupling unit of the driving coupler is inserted into an insertion recess of the second coupling unit of the driven coupler in the refrigerator depicted in FIG. 12.

FIG. 19 is a sectional view illustrating a state in which the first coupling unit of the driving coupler pressurizes the second coupling unit of the driven coupler in the refrigerator depicted in FIG. 12, and FIG. 20 is a sectional view illustrating a state in which the insertion protrusion of the first coupling unit of the driving coupler is inserted into the insertion recess of the second coupling unit of the driven coupler in the refrigerator depicted in FIG. 12.

Referring to FIGS. 15 and 18 through 20, operation of the coupling device of the refrigerator according to the sixth embodiment of the present disclosure will now be explained.

As exemplarily shown in FIG. 15, when the door is opened, the first cover 630 is elastically biased by the first spring 640 and hides the first coupling unit 610. That is, the first cover 630 prevents the side surface portion of the insertion protrusion 620 of the first coupling unit 610 from being exposed to the outside.

As exemplarily shown in FIG. 18, when the door is opened, the second cover 730 is elastically biased by the second spring 740 and hides the second coupling unit 710. That is, the second cover 730 prevents the insertion recess 720 of the second coupling unit 710 from being exposed to the outside.

When the door is closed, depending upon the position of the insertion protrusion 620 of the first coupling unit 610 and the position of the insertion recess 720 of the second coupling unit 710, the first coupling unit 610 and the second coupling unit 710 may be coupled directly or by operation wherein the second coupling unit 710 is pushed backward and the driving motor is driven to rotate the insertion protrusion 620 of the first coupling unit 610.

In detail, as exemplarily shown in FIG. 19, when the door is closed, if the insertion protrusion 620 of the first coupling unit 610 is located at a position incapable of being inserted into the insertion recess 720 of the second coupling unit 710, the insertion protrusion 620 of the first coupling unit 610 is not inserted into the insertion recess 720 and collides with the body part of the second coupling unit 710. Thus, the second coupling unit 710 is pressurized and moves backward into the base part 701 against elastic force of the third spring 750.

As such, since the second coupling unit 710 moves backward when collision between the insertion protrusion 620 of the first coupling unit 610 and the body part of the second coupling unit 710 occurs, minimal shock is produced and the door is completely closed.

Next, as exemplarily shown in FIG. 20, if the driving motor is driven in the state of FIG. 19, the first coupling unit 610 and the insertion protrusion 620 rotate by the driving motor. If the insertion protrusion 620 rotates to a certain extent and the insertion protrusion 620 is located at a position capable of being inserted into the insertion recess 720, the second coupling unit 710 moves forward out of the base part 701 by elastic restoring force of the third spring 750.

At this time, the body part of the second coupling unit 710 moves forward while pushing the first cover 630 of the driving coupler back, and the insertion protrusion 620 of the first coupling unit 610 moves forward while pushing the second cover 730 of the second coupling unit 710 back.

If the driving motor is continuously driven even after the insertion protrusion 620 is inserted into the insertion recess 720, the rotational force of the driving motor is transmitted to the feeding unit.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A refrigerator comprising:
a main body having a storage compartment; and
a door rotatably coupled to the main body to open or close the storage compartment, the door comprising an icemaker and an ice bucket configured to store ice cubes produced by the icemaker, the ice bucket being provided with a feeding device to feed the ice cubes stored therein,
wherein the main body comprises a driving device configured to drive the feeding device,
wherein when the door is closed, the driving device is connected to the feeding device, and
when the door is opened, the driving device is disconnected from the feeding device.

2. The refrigerator according to claim 1, wherein the driving device includes a driving motor to generate driving force and a driving coupler to be connected to the feeding device,
the feeding device includes a feeding unit to feed the ice cubes and a driven coupler to be connected with or separated from the driving coupler,
when the door is closed, the driving coupler and the driven coupler are connected to each other, and
when the door is opened, the driving coupler and the driven coupler are separated from each other.

3. The refrigerator according to claim 2, wherein the driven coupler includes a support part and a pressurized part protruding from the support part, the pressurized part having a proximal end located apart from a rotation center by a distance of a first radius and a distal end located apart from the rotation center by a distance of a second radius, and
the driving coupler includes a wing part and a pressurizing part protruding from the wing part, the pressurizing part having a proximal end and a distal end, at least one of which is located apart from the rotation center by a distance between the first radius and the second radius.

4. The refrigerator according to claim 3, wherein the driving coupler and the driven coupler are made of a resin material.

5. The refrigerator according to claim 2, wherein the driving motor is disposed at a side wall of the main body, and
the driving device includes a reducer to reduce rotation speed of the driving motor and transmit driving force from the driving motor to the driving coupler.

6. The refrigerator according to claim 2, wherein the driving motor is disposed at a top wall of the main body, and
the driving device includes at least one worm gear to transmit driving force from the driving motor to the driving coupler.

7. The refrigerator according to claim 2, wherein the ice bucket includes a storage space to store the ice cubes dropping from the icemaker and a crushing space in which the ice cubes are crushed into ice pieces, the crushing space being horizontally arranged in the storage space,
the feeding unit includes a rotation shaft horizontally extending to feed the ice cubes in the storage space to the crushing space, and
the driven coupler is disposed at the rotation shaft of the feeding unit.

8. The refrigerator according to claim 2, wherein the ice bucket includes a storage space to store the ice cubes dropping from the icemaker and a crushing space in which the ice cubes are crushed into ice pieces, the crushing space being disposed below the storage space,
the feeding unit includes a rotation shaft vertically or slantedly extending to feed the ice cubes in the storage space to the crushing space, and
the feeding device includes at least one worm gear to transmit driving force from the driven coupler to the feeding unit.

9. The refrigerator according to claim 2, wherein the ice bucket includes a discharge port to discharge the ice cubes therethrough and a crushing device to crush the ice cubes into ice pieces, and
the crushing device includes a fixed blade fixed to the ice bucket, a rotational blade coupled to a rotation shaft of the feeding unit, a guide member rotatably coupled to the discharge port to crush the ice cubes, and a switching motor to rotate the guide member.

10. A refrigerator comprising:
a main body having an inner casing, an outer casing and an insulation wall provided between the inner casing and the outer casing;
a storage compartment formed in the inner casing; and
a door rotatably coupled to the main body to open or close the storage compartment, the door comprising an icemaker and an ice bucket configured to store ice cubes produced by the icemaker, the ice bucket being provided with a feeding unit to feed the ice cubes stored therein,
wherein the main body comprises a driving motor to drive the feeding unit.

11. The refrigerator according to claim 10, wherein the inner casing is formed with a concave-shaped motor receiving part which is depressed inside the insulation wall, and
at least a portion of the driving motor is received in the motor receiving part.

12. The refrigerator according to claim 10, wherein the driving motor is fixed to an outer surface of the outer casing.

13. The refrigerator according to claim 10, wherein the driving motor is fixed to an inner surface of the inner casing.

14. The refrigerator according to claim 10, further comprising:
a driving force transmission device to transmit driving force from the driving motor to the feeding unit,
wherein the driving force transmission device includes a driving coupler provided at the main body and a driven coupler provided at the door and configured to be coupled to the driving coupler when the door is closed and to be separated from the driving coupler when the door is opened.

15. The refrigerator according to claim 14, wherein the driving force transmission device further includes a worm gear to transmit driving force from the driving motor to the driving coupler.

16. A refrigerator comprising:
a main body having a storage compartment; and
a door rotatably coupled to the main body to open or close the storage compartment, the door comprising an icemaker provided at the door, an ice bucket configured to store ice cubes produced by the icemaker and a feeding unit including a driven coupler to receive driving force, the feeding unit configured to feed the ice cubes in the ice bucket in a horizontal direction,
wherein the main body comprises a side wall and a driving motor assembly provided within the side wall, the driving motor including a driving coupler which is connected to or separated from the driven coupler.

17. A refrigerator comprising:
a main body having a storage compartment, the main body comprising a driving motor configured to generate driving force; and
a door rotatably coupled to the main body to open or close the storage compartment, the door comprising an icemaker and an ice bucket configured to store ice cubes produced by the icemaker, the ice bucket being provided with a feeding unit to feed the ice cubes stored therein; and
a coupling device to transmit driving force from the driving motor to the feeding unit, the coupling device including a driving coupler having a first coupling unit and a driven coupler having a second coupling unit which is engaged with the first coupling unit to receive driving force,
wherein the coupling device is configured to hide at least one of the first coupling unit and the second coupling unit when the door is opened.

18. The refrigerator according to claim 17, wherein the first coupling unit includes an insertion protrusion, and the second coupling unit includes an insertion recess into which the insertion protrusion is inserted.

19. The refrigerator according to claim 18, wherein the driving coupler further includes a first cover provided movably forward and backward around the insertion protrusion so as to hide the insertion protrusion when the door is opened.

20. The refrigerator according to claim 19, wherein the driving coupler further includes a first spring to elastically support the first cover so as to enable the first cover to hide the insertion protrusion.

21. The refrigerator according to claim 18, wherein the driven coupler further includes a second cover provided movably forward and backward in the insertion recess so as to hide the insertion recess when the door is opened.

22. The refrigerator according to claim 21, wherein the driven coupler further includes a second spring to elastically support the second cover so as to enable the second cover to hide the insertion recess.

23. The refrigerator according to claim 18, wherein if the insertion protrusion is located at a position incapable of being inserted into the insertion recess when the door is closed, the second coupling unit moves backward in an axial direction by pressurization of the insertion protrusion.

24. The refrigerator according to claim 23, wherein the driven coupler further includes a third spring to return the second coupling unit so that if the insertion protrusion moves to a position capable of being inserted into the insertion recess by operation of the driving motor in the state that the second coupling unit moves backward, the insertion protrusion is inserted into the insertion recess.

25. A refrigerator comprising:
a main body having an inner casing, an outer casing and an insulation wall provided between the inner casing and the outer casing;
a storage compartment formed in the main body; and
a door rotatably coupled to the main body to open or close the storage compartment the door comprising an icemaker and an ice bucket configured to store ice cubes produced by the icemaker, the ice bucket being provided with a feeding unit to feed the ice cubes stored therein,
wherein the main body comprises a driving motor to drive the feeding unit and a motor housing to accommodate the driving motor, the motor housing including a first housing supported by the inner casing and the insulation wall and a second housing coupled to the first housing.

26. The refrigerator according to claim 25, wherein the first housing is fixed to the inner casing by adhesive force of an insulation material used to form the insulation wall, and the second housing is screw-coupled to the first housing.

27. The refrigerator according to claim 25, wherein the second housing includes a protruding part protruding toward the storage compartment so as to define a space to accommodate the driving motor.

28. The refrigerator according to claim 27, wherein the storage compartment is provided with a mini-drawer to hide the protruding part.

29. The refrigerator according to claim 26, further comprising:
a first coupling unit coupled to a driving shaft of the driving motor and including an insertion protrusion configured to transmit driving force from the driving motor to the feeding unit; and
a second coupling unit coupled to a rotation shaft of the feeding unit and including an insertion recess into which the insertion protrusion is inserted.

30. The refrigerator according to claim 29, further comprising:
- a first cover provided movably forward and backward around the insertion protrusion so as to hide the insertion protrusion when the door is opened; and
- a second cover provided movably forward and backward in the insertion recess so as to hide the insertion recess when the door is opened.

31. The refrigerator according to claim 29, wherein the second housing is formed with an opening which is blocked by the first coupling unit when the door is opened and through which the second coupling unit passes when the first coupling unit and the second coupling unit are coupled.

* * * * *